US010133027B2

(12) United States Patent
Noda

(10) Patent No.: US 10,133,027 B2
(45) Date of Patent: Nov. 20, 2018

(54) ZOOM LENS AND IMAGING APPARATUS

(71) Applicant: FUJIFILM Corporation, Tokyo (JP)

(72) Inventor: Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 100 days.

(21) Appl. No.: 15/268,858

(22) Filed: Sep. 19, 2016

(65) Prior Publication Data
US 2017/0090169 A1 Mar. 30, 2017

(30) Foreign Application Priority Data

Sep. 28, 2015 (JP) ................. 2015-189933

(51) Int. Cl.
G02B 9/62 (2006.01)
G02B 13/04 (2006.01)
G02B 5/00 (2006.01)
G02B 15/173 (2006.01)
G02B 27/00 (2006.01)

(52) U.S. Cl.
CPC .............. G02B 9/62 (2013.01); G02B 5/005 (2013.01); G02B 13/04 (2013.01); G02B 15/173 (2013.01); G02B 27/0025 (2013.01)

(58) Field of Classification Search
CPC .................. G02B 9/62; G02B 13/04
USPC ................. 359/682, 752, 756–762
See application file for complete search history.

(56) References Cited

U.S. PATENT DOCUMENTS 4,830,477 A  5/1989 Takahashi et al.
6,191,894 B1 * 2/2001 Kitamura ............. G02B 15/173
                                                359/676
7,453,642 B2 * 11/2008 Fujimoto ............. G02B 15/173
                                                359/557
8,405,914 B2 * 3/2013 Yamashita ............ G03B 13/00
                                                359/676
2011/0007403 A1 1/2011 Matsuo
2011/0019288 A1 * 1/2011 Yamanaka ........... G02B 15/173
                                                359/684
2012/0026602 A1 2/2012 Uchida et al.
2012/0050603 A1 * 3/2012 Imaoka ................ G02B 15/161
                                                348/347

(Continued)

FOREIGN PATENT DOCUMENTS

JP    60-222814 A    11/1985
JP    2009-168933 A   7/2009

(Continued)

OTHER PUBLICATIONS

An Office Action mailed by the Japanese Patent Office dated Jun. 19, 2018, which corresponds to Japanese Patent Application No. 2015-189933 and is related to U.S. Appl. No. 15/268,858.

Primary Examiner — Nicholas R Pasko
(74) Attorney, Agent, or Firm — Studebaker & Brackett PC

(57) ABSTRACT

A zoom lens is constituted by, in order from the object side: a positive first lens group; a negative second lens group; a positive third lens group; a positive fourth lens group; a negative fifth lens group, and a positive sixth lens group. The distances among adjacent lens groups change when changing magnification from the wide angle end to the telephoto end. The first lens group is constituted by, in order from the object side, a negative lens, a positive lens, and a positive lens. The third lens group has a positive lens at the most object side thereof. A predetermined conditional formula is satisfied.

18 Claims, 17 Drawing Sheets

(56) References Cited

U.S. PATENT DOCUMENTS

| | | | | |
|---|---|---|---|---|
| 2013/0148005 A1* | 6/2013 | Imaoka | ................ | G02B 15/173 |
| | | | | 348/340 |
| 2014/0176778 A1* | 6/2014 | Kim | .................... | G02B 15/173 |
| | | | | 348/335 |
| 2015/0277090 A1* | 10/2015 | Sugita | ..................... | G03B 3/00 |
| | | | | 359/687 |
| 2016/0116722 A1* | 4/2016 | Bito | ....................... | G02B 15/20 |
| | | | | 348/240.1 |
| 2016/0327774 A1 | 11/2016 | Murayama | | |

FOREIGN PATENT DOCUMENTS

| | | | |
|---|---|---|---|
| JP | 2011-017912 A | 1/2011 | |
| JP | 2011-090190 A | 5/2011 | |
| JP | 2012-053444 A | 3/2012 | |
| JP | 2014-209144 A | 11/2014 | |
| JP | 2015-129788 A | 7/2015 | |
| JP | 2015-200870 A | 11/2015 | |
| WO | WO 2015004703 A1 * | 1/2015 | ............. G02B 15/20 |

* cited by examiner

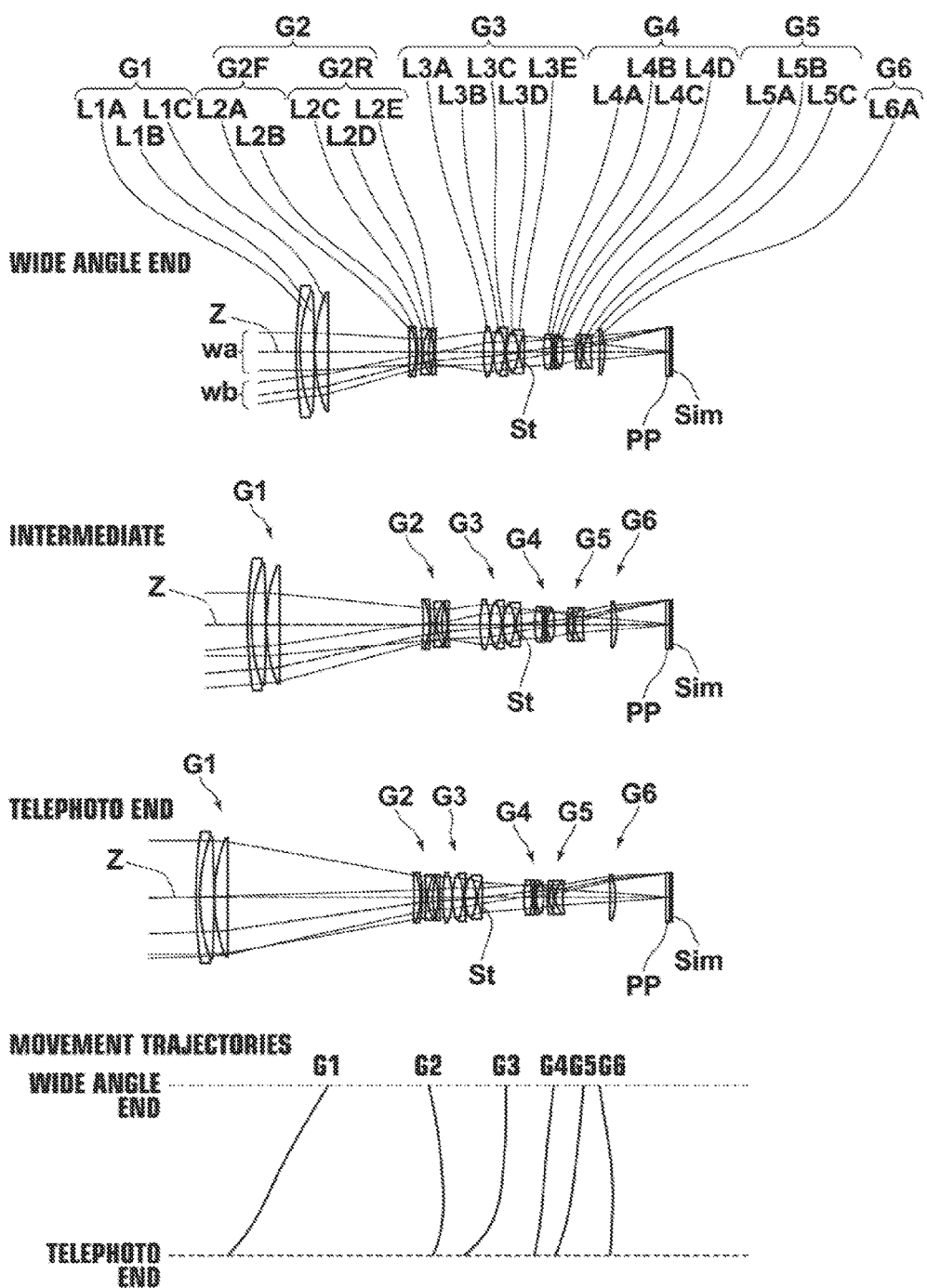
FIG.1 EXAMPLE 1

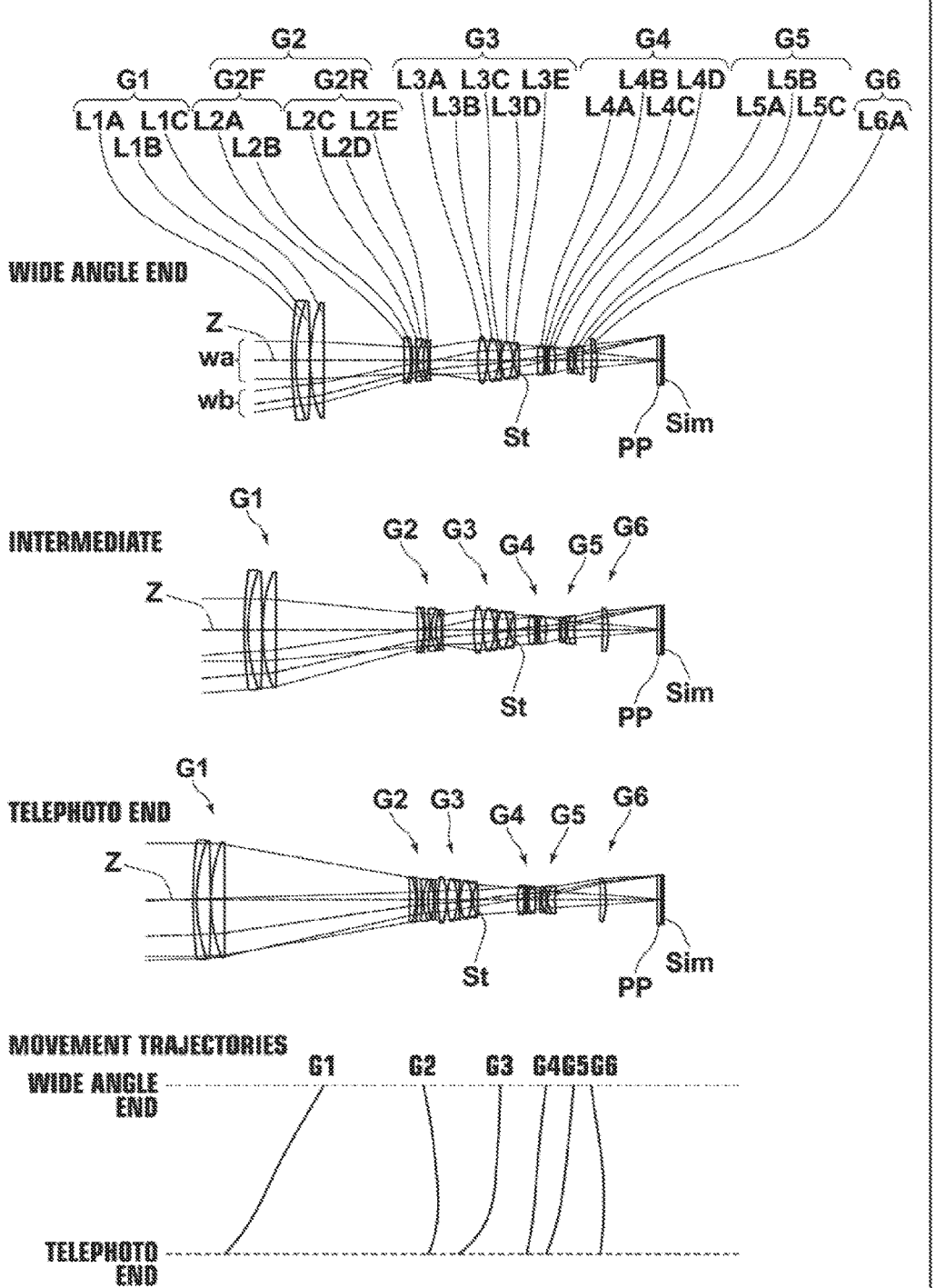

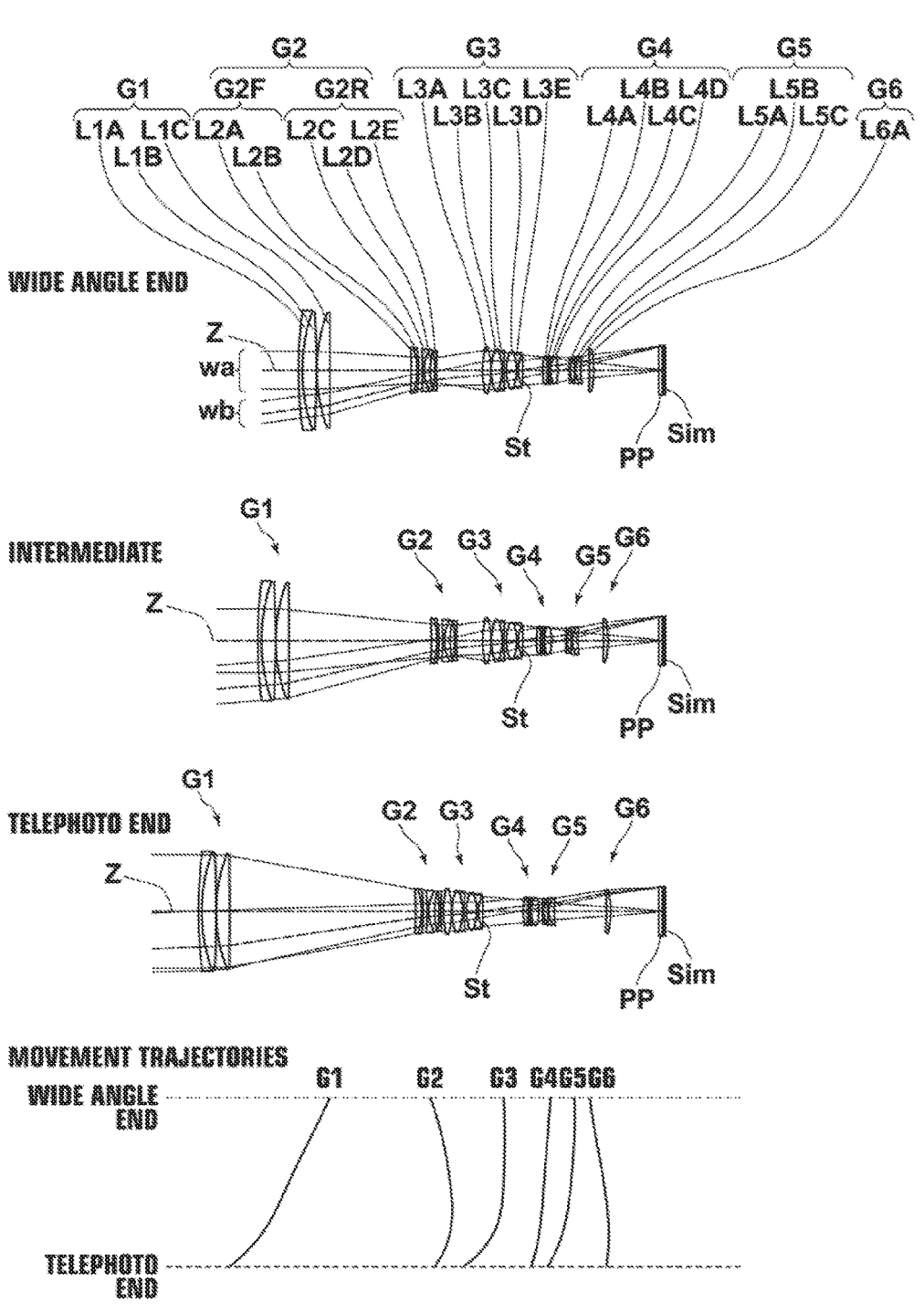
FIG.3 EXAMPLE 3

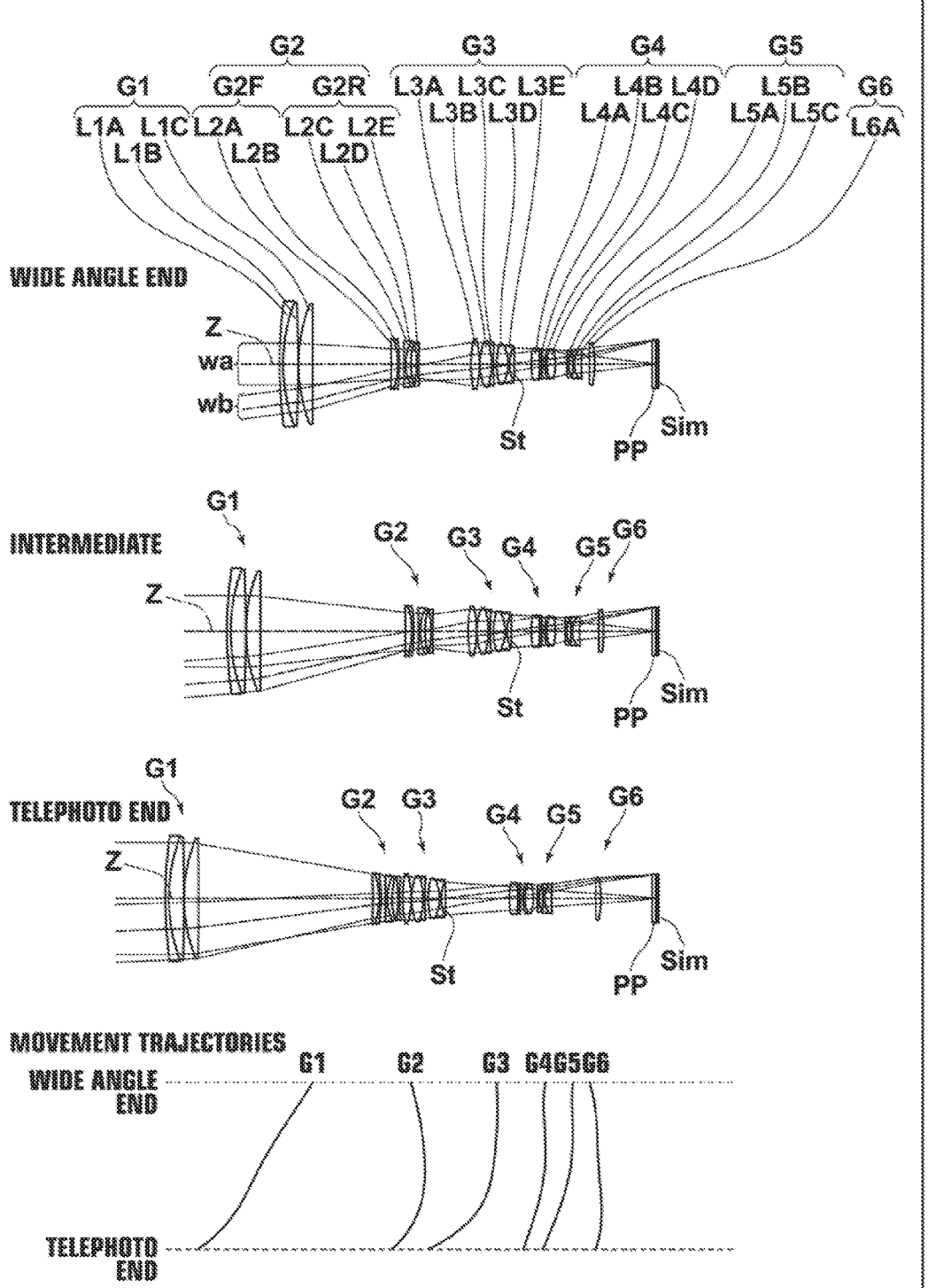
FIG.4 EXAMPLE 4

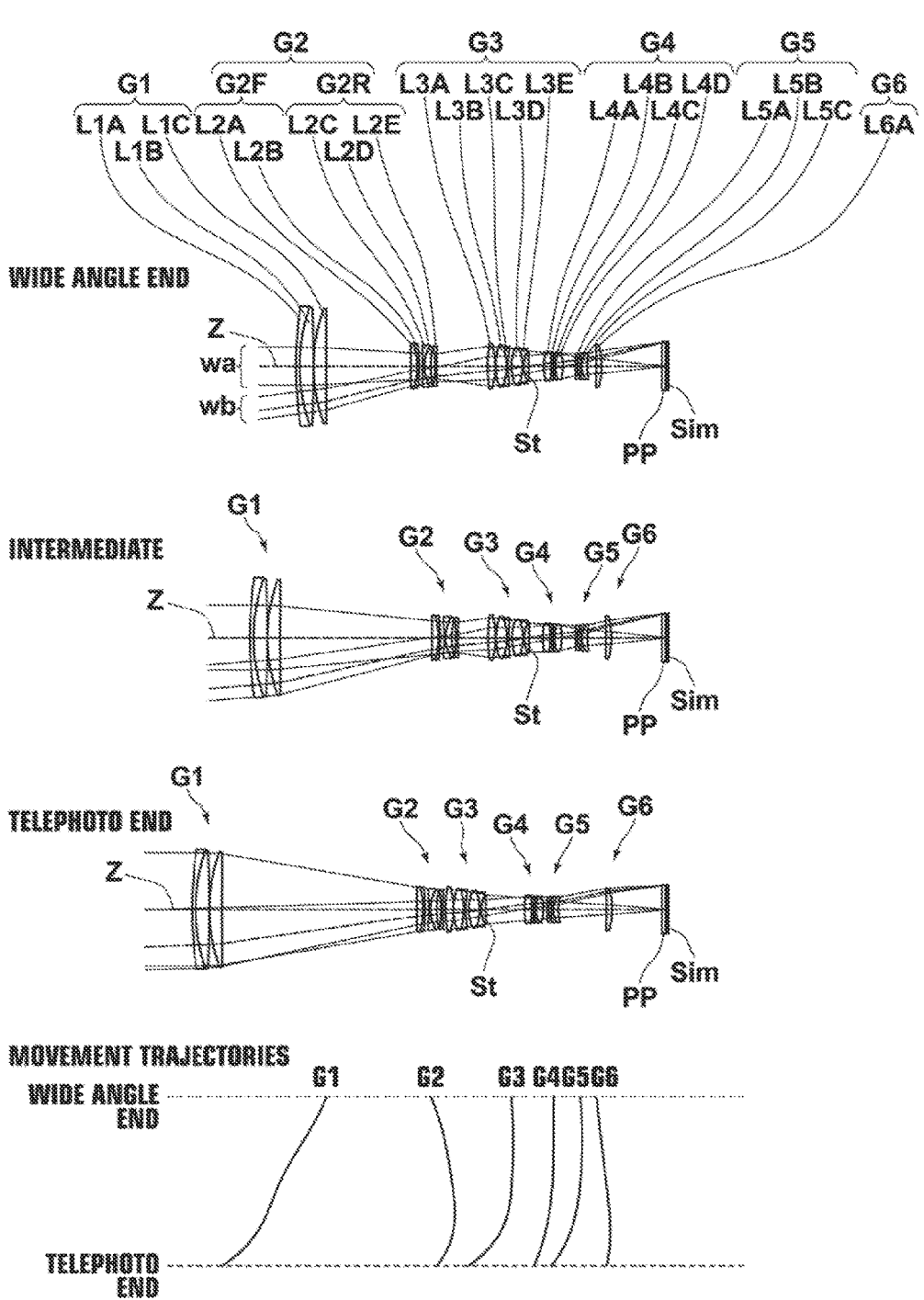

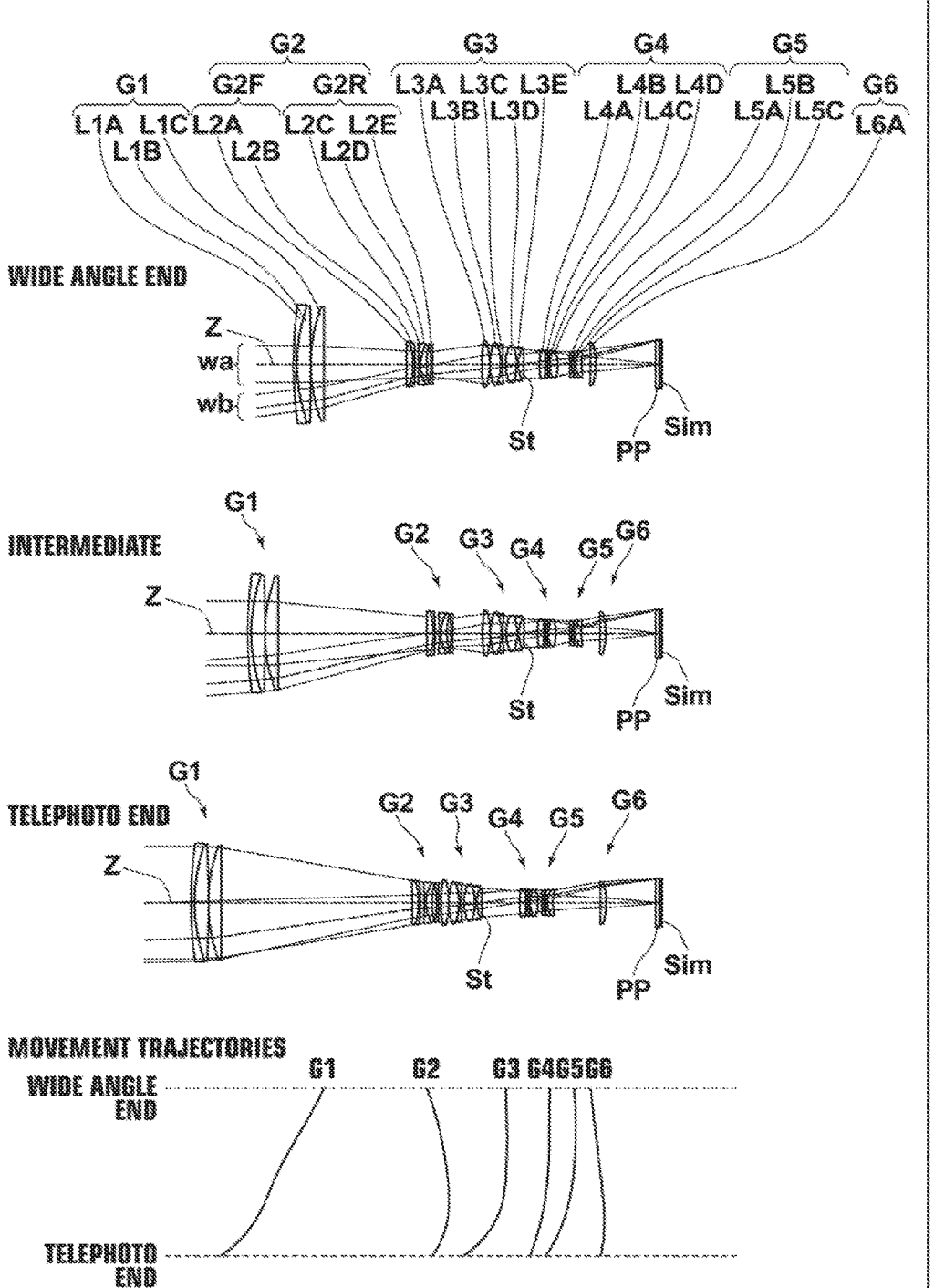
FIG.6 EXAMPLE 6

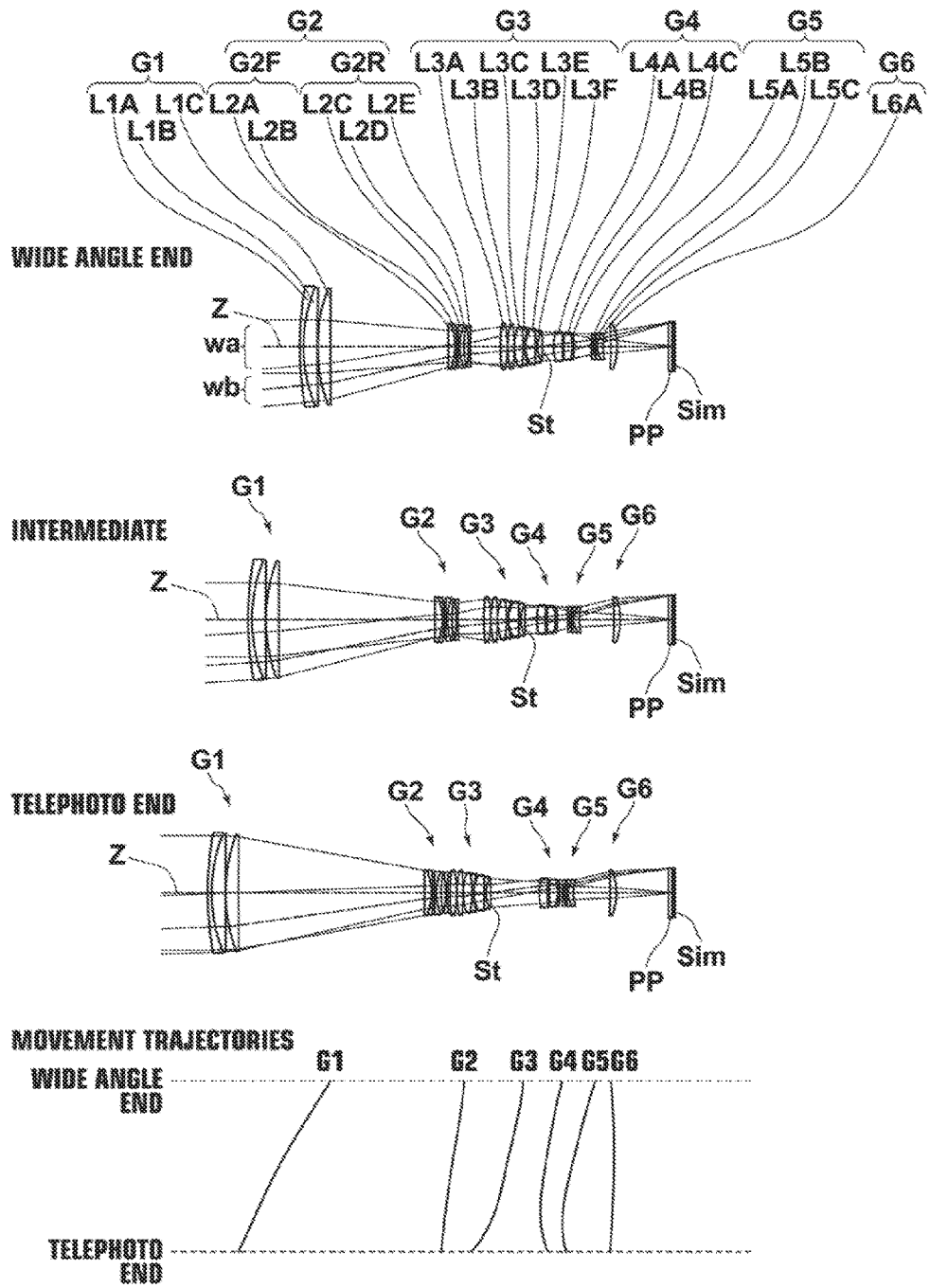
FIG.7 EXAMPLE 7

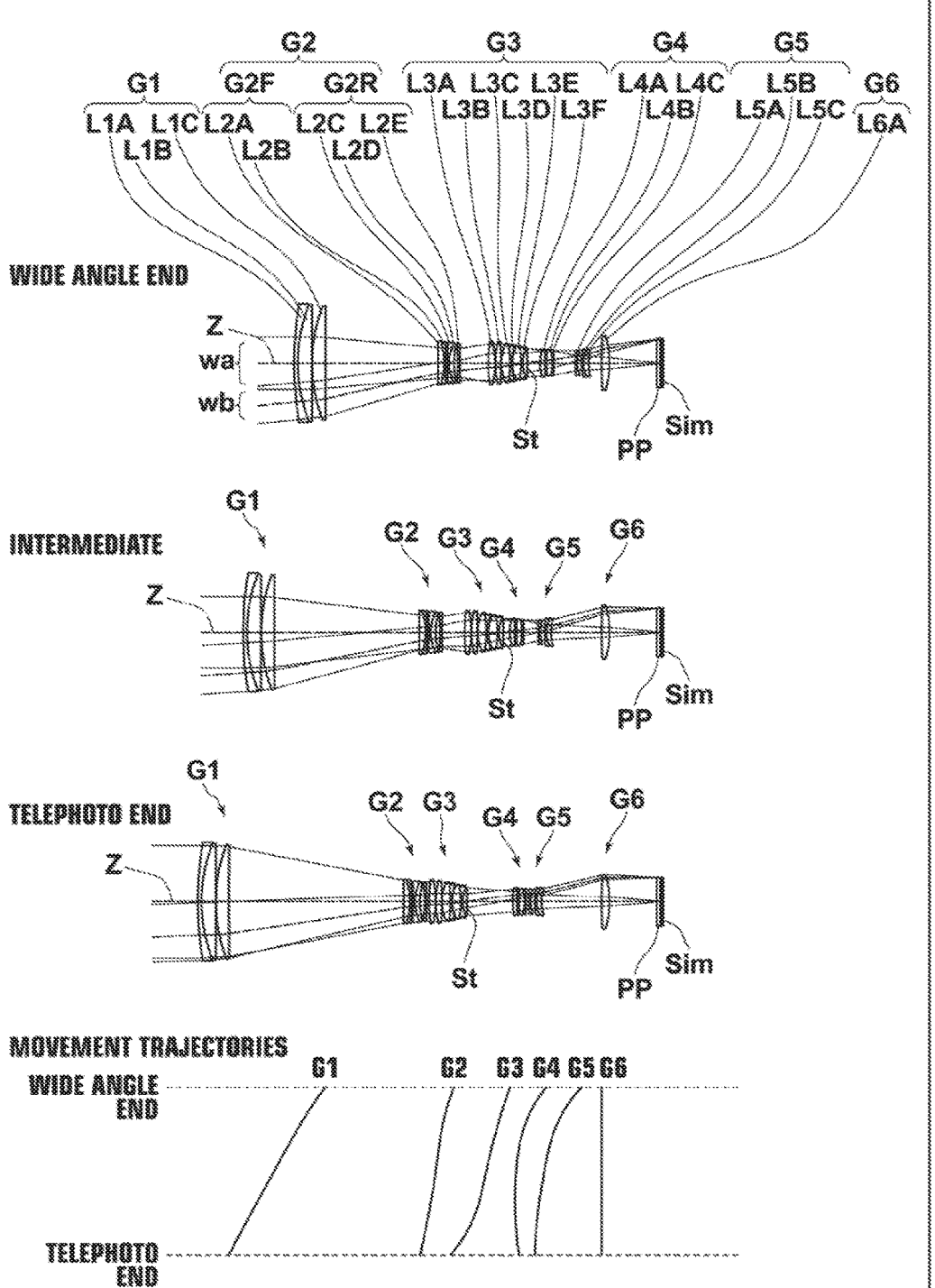

FIG.9 EXAMPLE 1
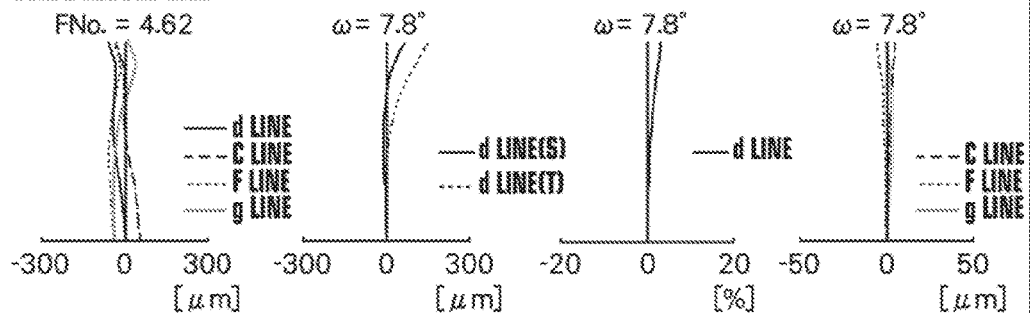
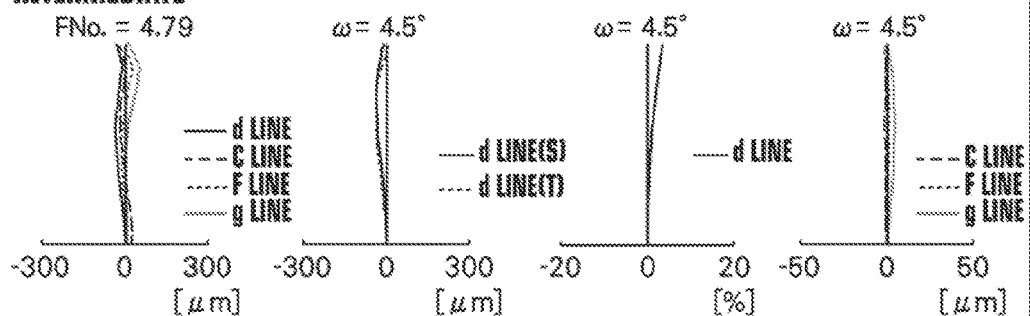
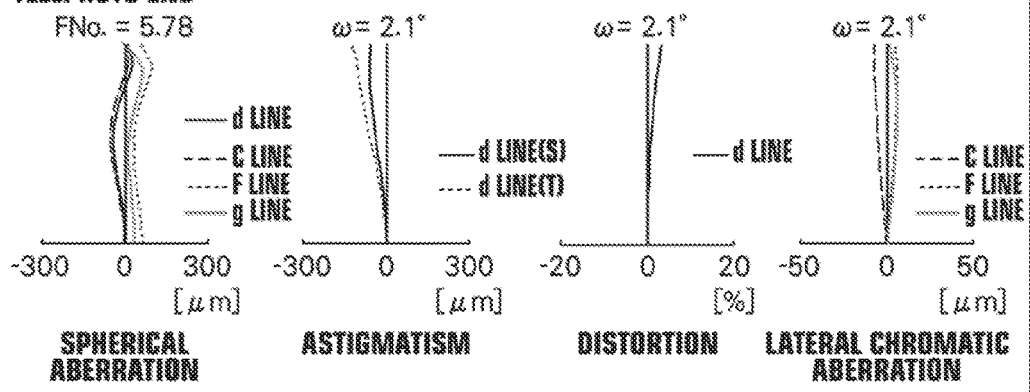

FIG.10 EXAMPLE 2
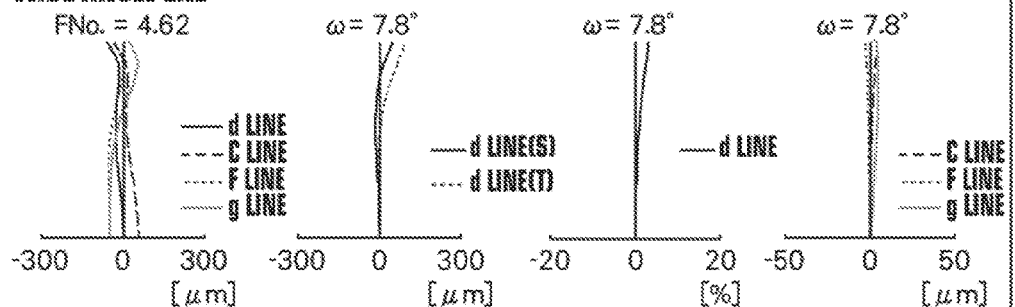
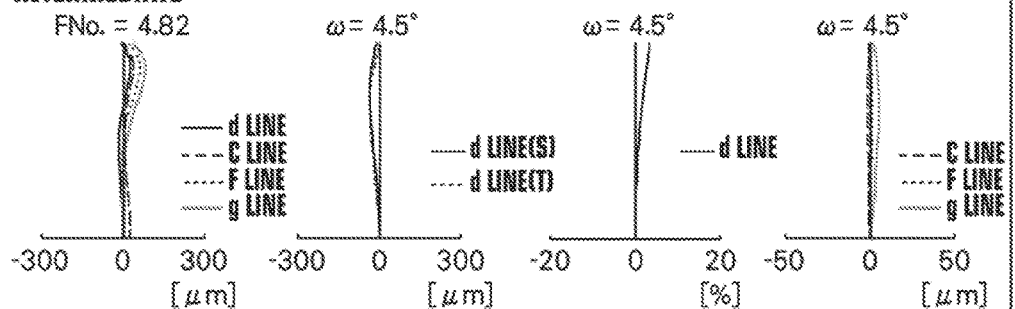
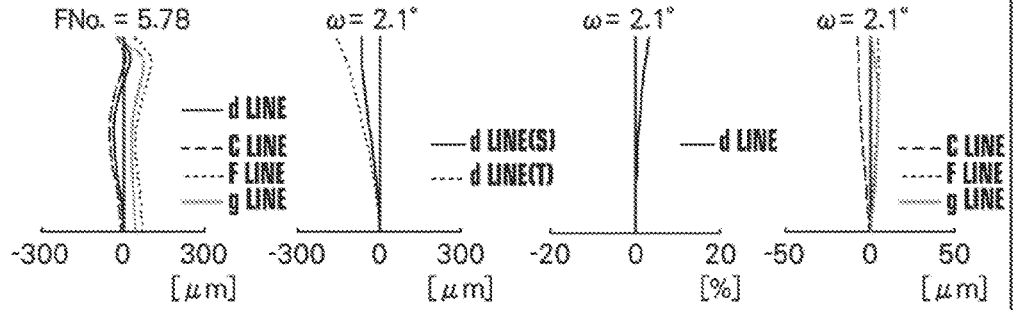

FIG.11
EXAMPLE 3
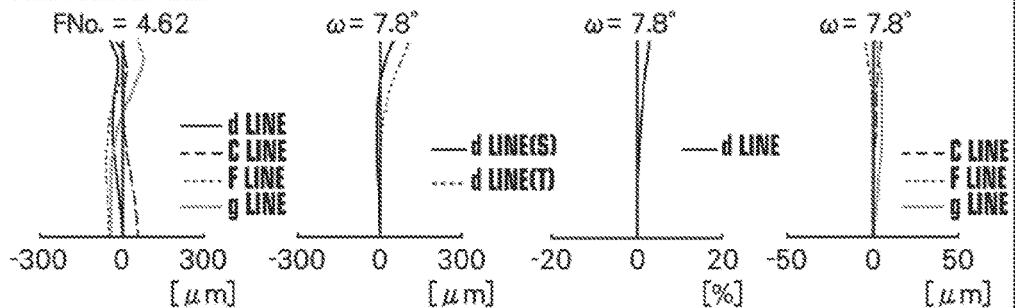
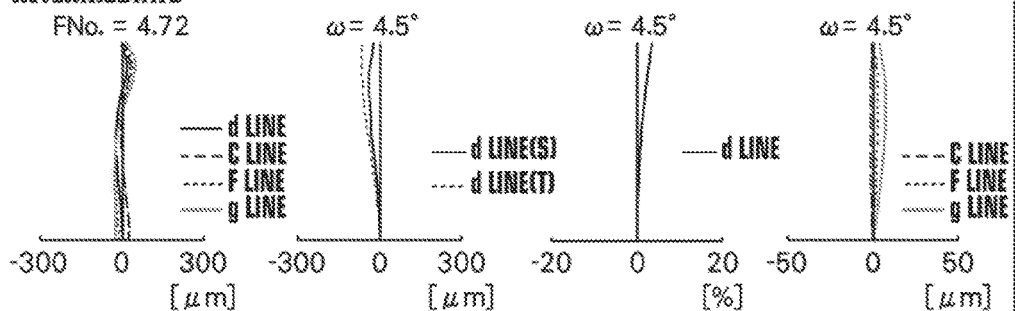
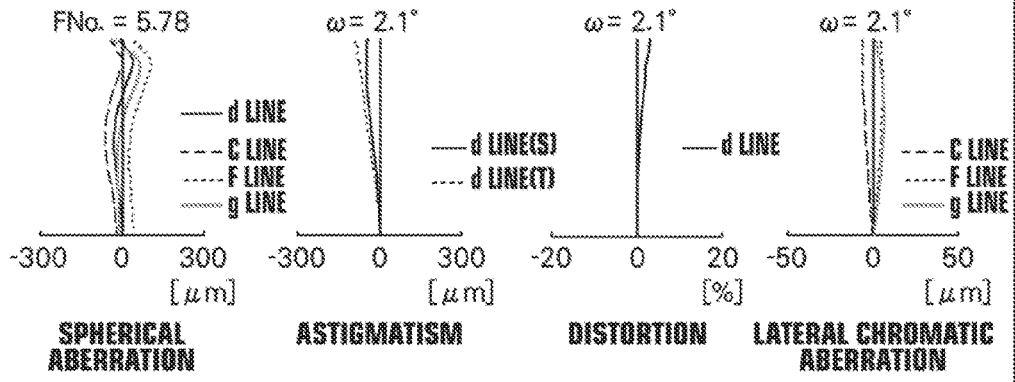

FIG.12
EXAMPLE 4
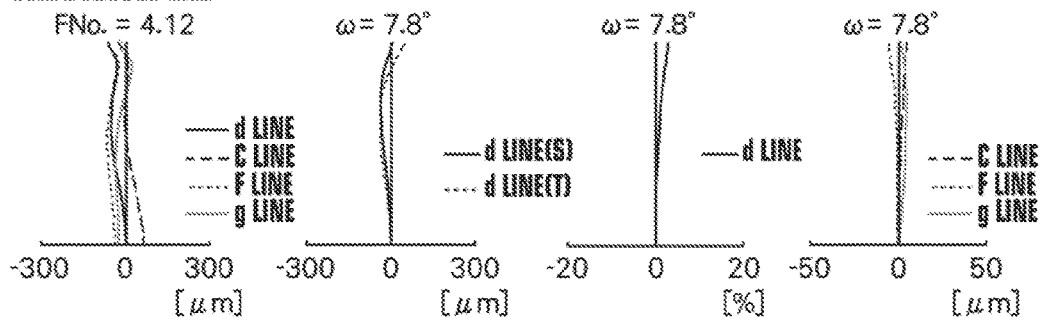
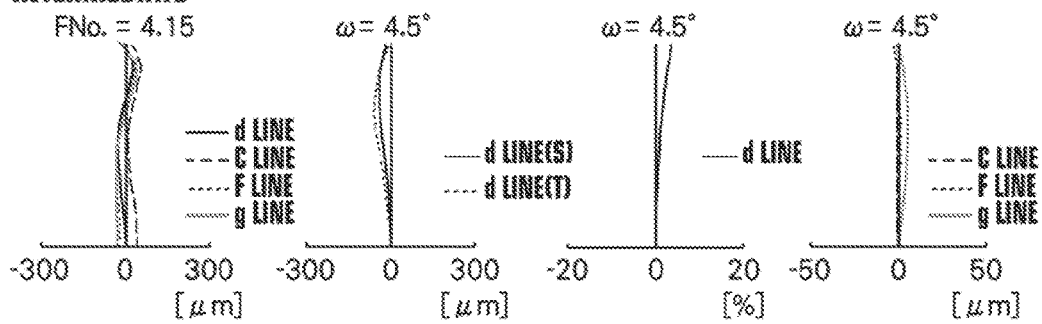
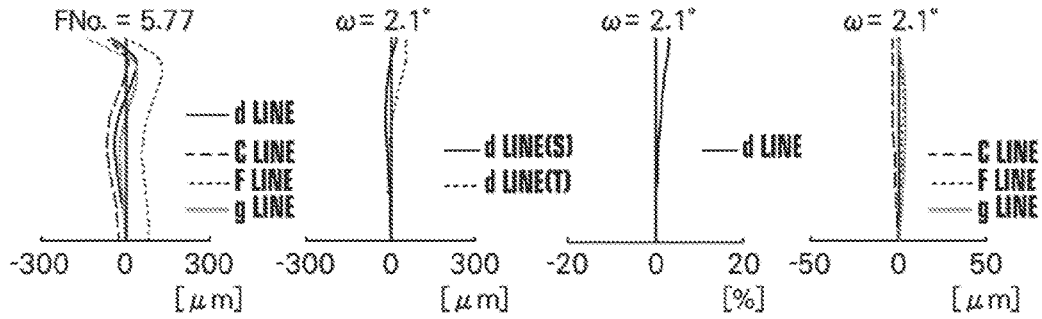

FIG.13
EXAMPLE 5
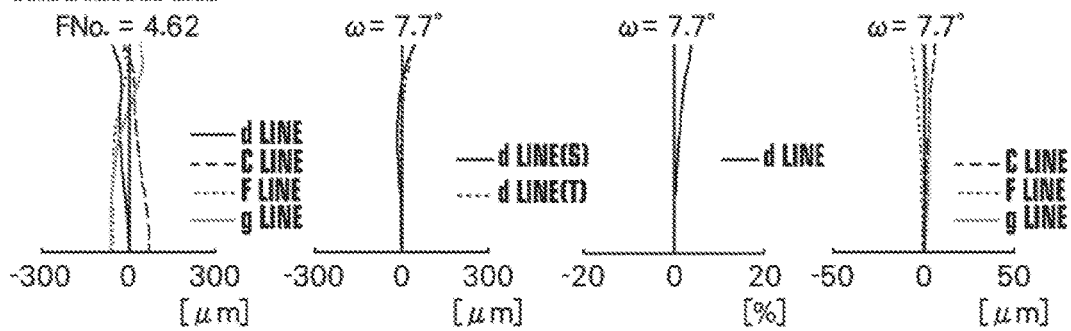
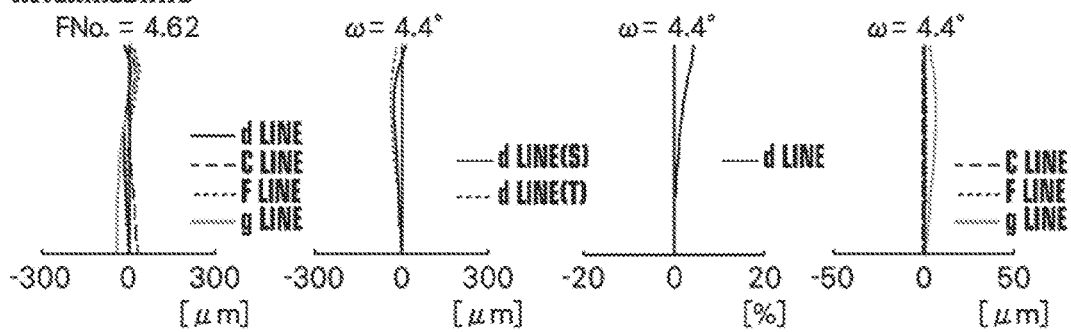
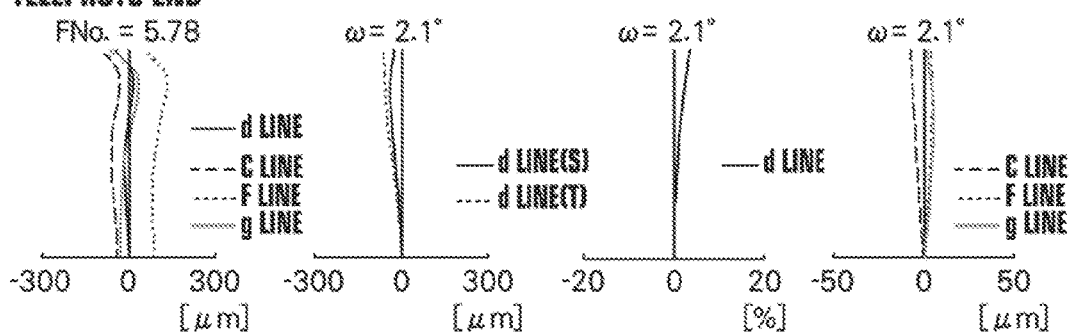

FIG.14  EXAMPLE 6
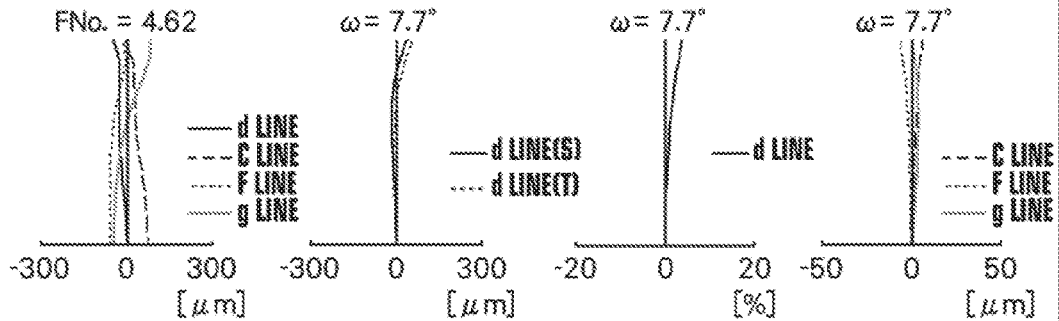
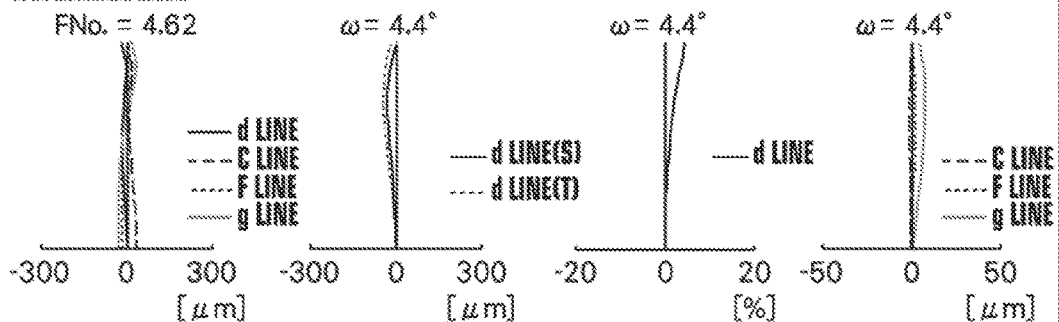
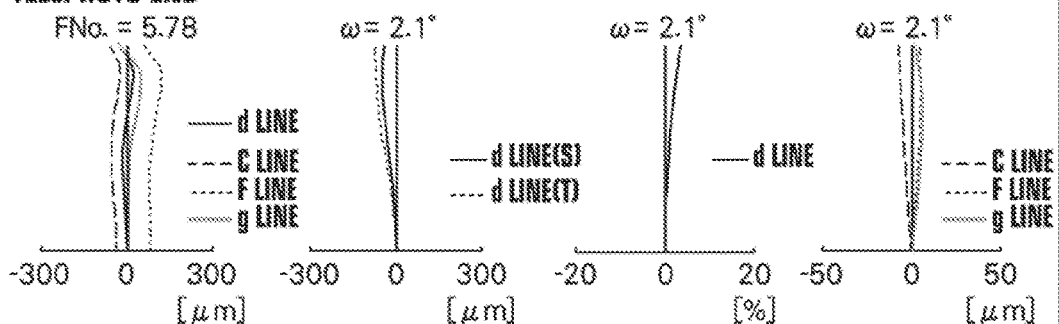

FIG.15
EXAMPLE 7
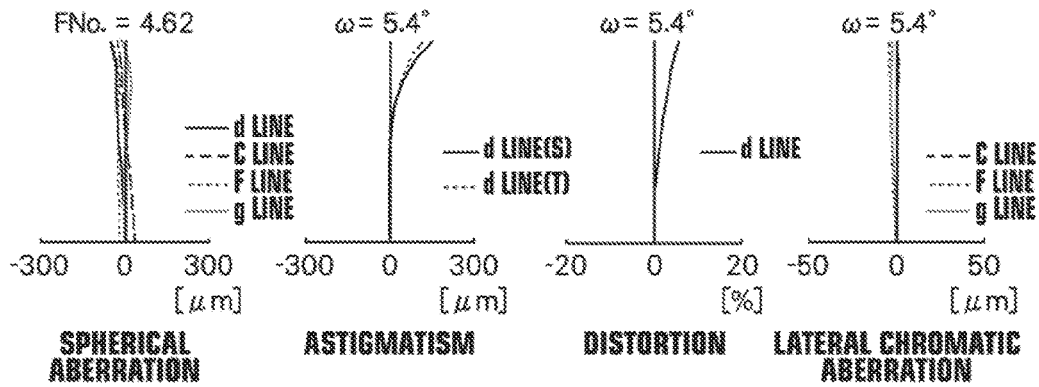
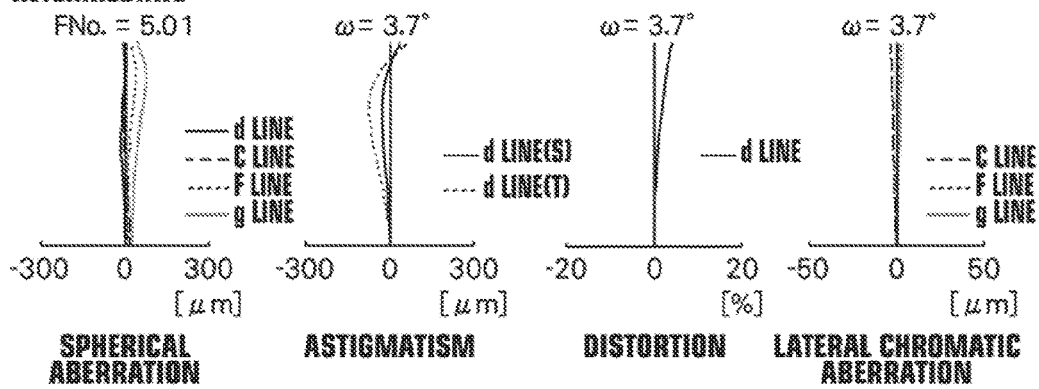
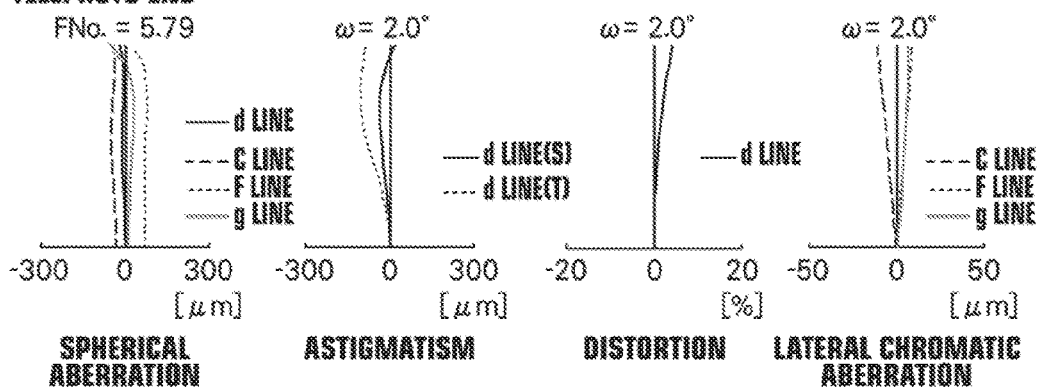

US 10,133,027 B2

ZOOM LENS AND IMAGING APPARATUS

CROSS REFERENCE TO RELATED APPLICATIONS

The present application claims priority under 35 U.S.C. § 119 to Japanese Patent Application No. 2015-189933 filed on Sep. 28, 2015. The above application is hereby expressly incorporated by reference, in its entirety, into the present application.

BACKGROUND

The present disclosure is related to a zoom lens which is particularly favorably suited for use in digital cameras, interchangeable lens digital cameras, and cinematic cameras. The present disclosure is also related to an imaging apparatus equipped with the zoom lens.

Zoom lenses use in digital cameras, interchangeable lens digital cameras, and cinematic cameras are known, as disclosed in Japanese Unexamined Patent Publication Nos. 2012-053444, 2014-209144, and S60 (1985)-222814.

SUMMARY

Recently, the number of pixels in digital cameras, interchangeable lens digital cameras, and cinematic cameras is increasing. Therefore, there is demand for a high performance lens, which is compatible with the increased number of pixels, and that favorably corrects various aberrations, as a zoom lens to be employed in these cameras. However, it cannot be said that the zoom lenses of Japanese Unexamined Patent Publication Nos. 2012-053444, 2014-209144, and S60 (1985)-222814 have sufficient performance with respect to correcting various aberrations.

The present disclosure has been developed in view of the foregoing circumstances. The present disclosure provides a zoom lens which favorably corrects various aberrations. The present disclosure also provides an imaging apparatus equipped with such a zoom lens.

A first zoom lens of the present disclosure consists of, in order from the object side to the image side:
a first lens group having a positive refractive power;
a second lens group having a negative refractive power;
a third lens group having a positive refractive power;
a fourth lens group having a positive refractive power;
a fifth lens group having a negative refractive power; and
a sixth lens group having a positive refractive power;
the first lens group moving toward the object side, the distance between the first lens group and the second lens group increasing, the distance between the second lens group and the third lens group decreasing, the distance between the third lens group and the fourth lens group changing, the distance between the fourth lens group and the fifth lens group changing, and the distance between the fifth lens group and the sixth lens group changing, when changing magnification from the wide angle end to the telephoto end;
the first lens group consisting of, in order from the object side to the image side, a negative 1A lens, a positive 1B lens, and a positive 1C lens;
the third lens group having a 3-A positive lens most toward the object side therein; and
Conditional Formula (1) below being satisfied:

$$39 < vd1A < 50 \tag{1}$$

wherein vd1A is the Abbe's number with respect to the d line of the 1A negative lens.

Note that it is more preferable for Conditional Formula (1-1) below to be satisfied.

$$41 < vd1A < 48 \tag{1-1}$$

In the zoom lens of the present disclosure, it is preferable for the third lens group to have at least three positive lenses.

In addition, it is preferable for Conditional Formula (2) below to be satisfied. Note that it is more preferable for Conditional Formula (2-1) below to be satisfied.

$$50 < vd3ave < 70 \tag{2}$$

$$55 < vd3ave < 65 \tag{2-1}$$

wherein vd3ave is the average Abbe's number with respect to the d line of the positive lenses within the third lens group.

In addition, it is preferable for Conditional Formula (3) below to be satisfied. Note that it is more preferable for Conditional Formula (3-1) below to be satisfied.

$$0.6 < f3A/f3 < 1.9 \tag{3}$$

$$0.8 < f3A/f3 < 1.7 \tag{3-1}$$

wherein f3A is the paraxial focal length with respect to the d line of the 3A positive lens, and f3 is the paraxial focal length with respect to the d line of the third lens group.

In addition, it is preferable for the third lens group to have a 3A cemented lens, in which a positive lens and a negative lens provided in this order from the object side to the image side are cemented together, positioned at the image side of the 3A positive lens, and for Conditional Formula (4) below to be satisfied. Note that it is more preferable for Conditional Formula (4-1) below to be satisfied. However, in the case that a plurality of such cemented lenses are included in the third lens group, the cemented lens closest to the 3A positive lens in the direction of the optical axis will be designated as the 3A cemented lens.

$$-1.3 < f3/fC3A < 0 \tag{4}$$

$$-1.1 < f3/fC3A < 0 \tag{4-1}$$

wherein f3 is the paraxial focal length with respect to the d line of the third lens group, and fC3A is the paraxial focal length with respect to the d line of the 3A cemented lens.

In addition, it is preferable for a stop to be positioned adjacent to the third lens group toward the image side thereof, and for the stop to move integrally with the third lens group when changing magnification.

In addition, it is preferable for Conditional Formula (5) below to be satisfied. Note that it is more preferable for Conditional Formula (5-1) below to be satisfied.

$$0.17 < f3/f1 < 0.35 \tag{5}$$

$$0.22 < f3/f1 < 0.3 \tag{5-1}$$

wherein f3 is the paraxial focal length with respect to the d line of the third lens group, and f1 is the paraxial focal length with respect to the d line of the first lens group.

In addition, it is preferable for Conditional Formula (6) below to be satisfied. Note that it is more preferable for Conditional Formula (6-1) below to be satisfied.

$$0.3 < X3/X1 < 0.8 \tag{6}$$

$$0.35 < X3/X1 < 0.7 \tag{6-1}$$

wherein X3 is the amount of displacement of the third lens group when changing magnification from the wide angle end to the telephoto end, and X1 is the amount of displacement of the first lens group when changing magnification from the wide angle end to the telephoto end.

Here, the "amount of displacement" refers to the length of the difference of the position of each lens group at the wide angle end and the position of each lens group at the telephoto end.

In addition, it is preferable for Conditional Formula (7) below to be satisfied. Note that it is more preferable for Conditional Formula (7-1) below to be satisfied.

$$0.1 < D56w/D56t < 0.3 \tag{7}$$

$$0.15 < D56w/D56t < 0.25 \tag{7-1}$$

wherein D56w is the distance along the optical axis from the apex of the surface most toward the image side within the fifth lens group to the apex of the surface most toward the object side within the sixth lens group at the wide angle end, and D56t is the distance along the optical axis from the apex of the surface most toward the image side within the fifth lens group to the apex of the surface most toward the object side within the sixth lens group at the telephoto end.

In addition, it is preferable for the sixth lens group to consist of a positive 6A lens.

A second zoom lens of the present disclosure consists of, in order from the object side to the image side:
a first lens group having a positive refractive power;
a second lens group having a negative refractive power;
a third lens group having a positive refractive power;
a fourth lens group having a positive refractive power;
a fifth lens group having a negative refractive power; and
a sixth lens group having a positive refractive power;
the first lens group moving toward the object side, the distance between the first lens group and the second lens group increasing, the distance between the second lens group and the third lens group decreasing, the distance between the third lens group and the fourth lens group changing, the distance between the fourth lens group and the fifth lens group changing, and the distance between the fifth lens group and the sixth lens group changing, when changing magnification from the wide angle end to the telephoto end;
the first lens group consisting of, in order from the object side to the image side, a negative 1A lens, a positive 1B lens, and a positive 1C lens; and
Conditional Formula (1-2) below being satisfied:

$$39 < vd1A < 45 \tag{1-2}$$

wherein vd1A is the Abbe's number with respect to the d line of the 1A negative lens.

An imaging apparatus of the present disclosure is equipped with a zoom lens of the present disclosure described above.

Note that the expression "consists" of means that the zoom lens of the present disclosure may also include lenses that practically have no power, optical elements other than lenses such as a stop, a mask, a cover glass, and filters, and mechanical components such as lens flanges, a lens barrel, an imaging element, a camera shake correcting mechanism, etc., in addition to the constituent elements listed above.

In addition, the surface shapes of lenses as well as the signs of the refractive powers of lenses are those which are considered in the paraxial region for lenses that include aspherical surfaces.

The first zoom lens of the present disclosure consists of, in order from the object side to the image side: the first lens group having a positive refractive power; the second lens group having a negative refractive power; the third lens group having a positive refractive power; the fourth lens group having a positive refractive power; the fifth lens group having a negative refractive power; and the sixth lens group having a positive refractive power. The first lens group moves toward the object side, the distance between the first lens group and the second lens group increases, the distance between the second lens group and the third lens group decreases, the distance between the third lens group and the fourth lens group changes, the distance between the fourth lens group and the fifth lens group changes, and the distance between the fifth lens group and the sixth lens group changes, when changing magnification from the wide angle end to the telephoto end. The first lens group consists of, in order from the object side to the image side, a negative 1A lens, a positive 1B lens, and a positive 1C lens. The third lens group has a 3-A positive lens most toward the object side therein. In addition, Conditional Formula (1) below is satisfied. Therefore, it is possible for the zoom lens to be that which favorably corrects various aberrations.

$$39 < vd1A < 50 \tag{1}$$

The second zoom lens of the present disclosure consists of, in order from the object side to the image side: the first lens group having a positive refractive power; the second lens group having a negative refractive power; the third lens group having a positive refractive power; the fourth lens group having a positive refractive power; the fifth lens group having a negative refractive power; and the sixth lens group having a positive refractive power. The first lens group moves toward the object side, the distance between the first lens group and the second lens group increases, the distance between the second lens group and the third lens group decreases, the distance between the third lens group and the fourth lens group changes, the distance between the fourth lens group and the fifth lens group changes, and the distance between the fifth lens group and the sixth lens group changes, when changing magnification from the wide angle end to the telephoto end. The first lens group consists of, in order from the object side to the image side, a negative 1A lens, a positive 1B lens, and a positive 1C lens. In addition, Conditional Formula (1-2) below is satisfied. Therefore, it is possible for the zoom lens to be that which favorably corrects various aberrations.

$$39 < vd1A < 45 \tag{1-2}$$

The imaging apparatus of the present disclosure is equipped with the zoom lens of the present disclosure. Therefore, the imaging apparatus can obtain images having high image quality.

BRIEF DESCRIPTION OF THE DRAWINGS

FIG. 1 is a collection of sectional diagrams that illustrate a first example of the configuration of a zoom lens according to an embodiment of the present disclosure (which is common with Example 1).

FIG. 2 is a collection of sectional diagrams that illustrate the configuration of a zoom lens according to Example 2.

FIG. 3 is a collection of sectional diagrams that illustrate the configuration of a zoom lens according to Example 3.

FIG. 4 is a collection of sectional diagrams that illustrate the configuration of a zoom lens according to Example 4.

FIG. 5 is a collection of sectional diagrams that illustrate the configuration of a zoom lens according to Example 5.

FIG. 6 is a collection of sectional diagrams that illustrate the configuration of a zoom lens according to Example 6.

FIG. 7 is a collection of sectional diagrams that illustrate the configuration of a zoom lens according to Example 7.

FIG. 8 is a collection of sectional diagrams that illustrate the configuration of a zoom lens according to Example 8.

FIG. 9 is a collection of diagrams that illustrate aberrations of the zoom lens of Example 1.

FIG. 10 is a collection of diagrams that illustrate aberrations of the zoom lens of Example 2.

FIG. 11 is a collection of diagrams that illustrate aberrations of the zoom lens of Example 3.

FIG. 12 is a collection of diagrams that illustrate aberrations of the zoom lens of Example 4.

FIG. 13 is a collection of diagrams that illustrate aberrations of the zoom lens of Example 5.

FIG. 14 is a collection of diagrams that illustrate aberrations of the zoom lens of Example 6.

FIG. 15 is a collection of diagrams that illustrate aberrations of the zoom lens of Example 7.

DETAILED DESCRIPTION OF THE PREFERRED EMBODIMENTS

Figure 16:
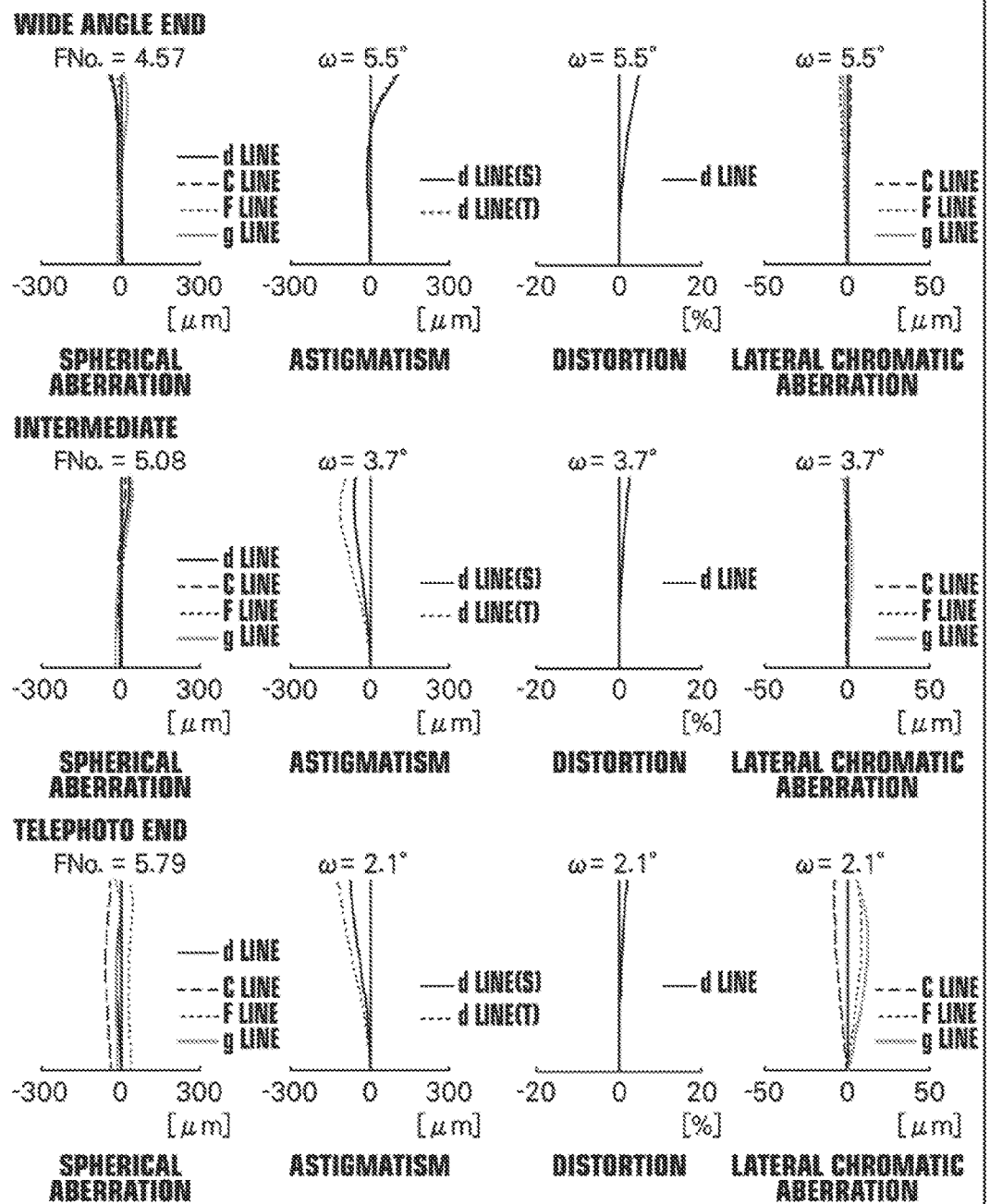
FIG. 16 is a collection of diagrams that illustrate aberrations of the zoom lens of Example 8.

Hereinafter, embodiments of the present disclosure will be described in detail with reference to the attached drawings. FIG. 1 is a collection of sectional diagrams that illustrate the configuration of a zoom lens according to an embodiment of the present disclosure. The example of the configuration illustrated in FIG. 1 is the same as the configuration of a zoom lens of Example 1 to be described later. In FIG. 1, the left side is the object side and the right side is the image side. The aperture stop St illustrated in FIG. 1 does not necessarily represent the size or shape thereof, but the position of the aperture stop St along an optical axis Z. In addition, FIG. 1 illustrates an axial light beam wa and a light beam wb at a maximum angle of view.

First, a zoom lens of a first embodiment will be described. The zoom lens of the first embodiment corresponds to Examples 1 through 8 to be described later. As illustrated in FIG. 1, the zoom lens of the first embodiment is constituted by, in order from the object side to the image side: a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power.

When this zoom lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIG. 1 illustrates an example in which a plane parallel plate shaped optical member PP that presumes the presence of such components is provided between the lens system and the imaging surface Sim.

This zoom lens is configured such that the first lens group G1 constantly moves toward the object side, the distance between the first lens group G1 and the second lens group G2 constantly increases, the distance between the second lens group G2 and the third lens group G3 constantly decreases, the distance between the third lens group G3 and the fourth lens group G4 constantly changes, the distance between the fourth lens group G4 and the fifth lens G5 group constantly changes, and the distance between the fifth lens group G5 and the sixth lens group G6 constantly changes, when changing magnification from the wide angle end to the telephoto end. Note that all of the lens groups from among the first lens group G1 through the sixth lens group G6 may move, or only a portion of the lens groups may move, when changing magnification.

Adopting such a configuration is advantageous from the viewpoint of shortening the total length of the lens system. The advantageous effects of securing telecentric properties and shortening the total length of the lens system become particularly prominent in the case that the zoom lens is applied to a non reflex (so called mirrorless) type camera, in which back focus is short.

The first lens group G1 is constituted by, in order from the object side to the image side, a negative 1A lens L1A, a positive 1B lens L1B, and a positive 1C lens L1C. Adopting such a configuration is advantageous from the viewpoint of shortening the total length of the lens system. In addition, the negative 1A lens L1A bears the function of correcting longitudinal chromatic aberration, lateral chromatic aberration, and spherical aberration. In addition, providing the two positive lenses, which are the positive 1B lens L1B and the positive 1C lens L1C, enables the generation of spherical aberration to be suppressed while securing the positive refractive power of the first lens group G1 and shortening the total length of the lens system.

The second lens group G2 principally bears the function of changing magnification.

The third lens group G3 has a positive 3A lens L3A at the most object side thereof. The third lens group G3 principally bears the positive refractive power of the entire lens system. Here, the positive 3A lens L3A exhibits the advantageous effect of decreasing the diameters of lenses which are positioned more toward the image side than the third lens group G3.

The fourth lens group G4 distributes positive refractive power with the third lens group G3, and bears the functions of suppressing the generation of spherical aberration, and suppressing fluctuations in spherical aberrations while changing magnification.

The fifth lens group G5 bears the function of correcting fluctuations in astigmatism while changing magnification.

The sixth lens group G6 bears the function of decreasing the incident angles of light rays at peripheral angles of view that enter an image formation plane Sim.

Further, the zoom lens is configured such that Conditional Formula (1) below is satisfied. Configuring the zoom lens such that the value of vd1A is not less than or equal to the lower limit defined in Conditional Formula (1) is advantageous from the viewpoint of correcting longitudinal chromatic aberration close to the blue side toward the telephoto end. In addition, configuring the zoom lens such that the value of vd1A is not greater than or equal to the upper limit defined in Conditional Formula (1) is advantageous from the viewpoint of correcting lateral chromatic aberration toward the wide angle end. Note that more favorable properties can be obtained in the case that Conditional Formula (1-1) below is satisfied.

$$39 < vd1A < 50 \tag{1}$$

$$41 < vd1A < 48 \tag{1-1}$$

wherein νd1A is the Abbe's number with respect to the d line of the 1A negative lens.

In the zoom lens of the present disclosure, it is preferable for the third lens group to have at least three positive lenses. Adopting such a configuration is advantageous from the viewpoint of suppressing longitudinal chromatic aberration and spherical aberration.

In addition, it is preferable for Conditional Formula (2) below to be satisfied. Configuring the zoom lens such that the value of νd3ave is not less than or equal to the lower limit defined in Conditional Formula (2) is advantageous from the viewpoint of correcting longitudinal chromatic aberration. In addition, there is a tendency for the refractive index to decrease as the Abbe's number increases. Therefore, it is necessary to secure refractive power by decreasing the curvatures of lenses. For this reason, configuring the zoom lens such that the value of νd3ave is not greater than or equal to the upper limit defined in Conditional Formula (2) is advantageous from the viewpoint of preventing the lenses from becoming excessively large. Note that more favorable properties can be obtained in the case that Conditional Formula (2-1) below is satisfied.

$$50 < \nu d3ave < 70 \tag{2}$$

$$55 < \nu d3ave < 65 \tag{2-1}$$

wherein νd3ave is the average Abbe's number with respect to the d line of the positive lenses within the third lens group.

In addition, it is preferable for Conditional Formula (3) below to be satisfied. Configuring the zoom lens such that the value of f3A/f3 is not less than or equal to the lower limit defined in Conditional Formula (3) is advantageous from the viewpoint of correcting spherical aberration. In addition, configuring the zoom lens such that the value of f3A/f3 is not greater than or equal to the upper limit defined in Conditional Formula (3) is advantageous from the viewpoints of decreasing the diameter of the lens and decreasing the F number. Note that more favorable properties can be obtained in the case that Conditional Formula (3-1) below is satisfied.

$$0.6 < f3A/f3 < 1.9 \tag{3}$$

$$0.8 < f3A/f3 < 1.7 \tag{3-1}$$

wherein f3A is the paraxial focal length with respect to the d line of the 3A positive lens, and f3 is the paraxial focal length with respect to the d line of the third lens group.

In addition, it is preferable for the third lens group G3 to have a 3A cemented lens (in FIG. 1, the cemented lens constituted by the lens L3B and the lens L3C), in which a positive lens and a negative lens provided in this order from the object side to the image side are cemented together, positioned at the image side of the 3A positive lens L3A, and for Conditional Formula (4) below to be satisfied. The generation of spherical aberration can be suppressed, while longitudinal chromatic aberration can be corrected, by providing the 3A cemented lens in this manner. Configuring the zoom lens such that the value of f3/f3CA is not less than or equal to the lower limit defined in Conditional Formula (4) is advantageous from the viewpoint of suppressing the generation of spherical aberration. In addition, configuring the zoom lens such that the value of f3/f3CA is not greater than or equal to the upper limit defined in Conditional Formula (4) is advantageous from the viewpoint of correcting longitudinal chromatic aberration. Note that more favorable properties can be obtained in the case that Conditional Formula (4-1) below is satisfied.

$$-1.3 < f3/fC3A < 0 \tag{4}$$

$$-1.1 < f3/fC3A < 0 \tag{4-1}$$

wherein f3 is the paraxial focal length with respect to the d line of the third lens group, and fC3A is the paraxial focal length with respect to the d line of the 3A cemented lens.

In addition, it is preferable for an aperture stop St to be positioned adjacent to the third lens group G3 toward the image side thereof, and for the aperture stop St to move integrally with the third lens group G3 when changing magnification. Positioning the aperture stop St at the image side of the third lens group G3 in this manner is advantageous from the viewpoint of miniaturizing a stop unit.

In addition, it is preferable for Conditional Formula (5) below to be satisfied. Configuring the zoom lens such that the value of f3/f1 is not less than or equal to the lower limit defined in Conditional Formula (5) is advantageous from the viewpoint of suppressing the generation of spherical aberration. In addition, configuring the zoom lens such that the value of f3/f1 is not greater than or equal to the upper limit defined in Conditional Formula (5) is advantageous from the viewpoints of miniaturizing the lens system and shortening the total length thereof. Note that more favorable properties can be obtained in the case that Conditional Formula (5-1) below is satisfied.

$$0.17 < f3/f1 < 0.35 \tag{5}$$

$$0.22 < f3/f1 < 0.3 \tag{5-1}$$

wherein f3 is the paraxial focal length with respect to the d line of the third lens group, and f1 is the paraxial focal length with respect to the d line of the first lens group.

In addition, it is preferable for Conditional Formula (6) below to be satisfied. Configuring the zoom lens such that the value of X3/X1 is not less than or equal to the lower limit defined in Conditional Formula (6) is advantageous from the viewpoint of shortening the total length of the lens system. In addition, configuring the zoom lens such that the value of X3/X1 is not greater than or equal to the upper limit defined in Conditional Formula (6) is advantageous from the viewpoints of suppressing spherical aberration and decreasing the F number. Note that more favorable properties can be obtained in the case that Conditional Formula (6-1) below is satisfied.

$$0.3 < X3/X1 < 0.8 \tag{6}$$

$$0.35 < X3/X1 < 0.7 \tag{6-1}$$

wherein X3 is the amount of displacement of the third lens group when changing magnification from the wide angle end to the telephoto end, and X1 is the amount of displacement of the first lens group when changing magnification from the wide angle end to the telephoto end.

In addition, it is preferable for Conditional Formula (7) below to be satisfied. Configuring the zoom lens such that the value of D56w/D56t is not less than the lower limit defined in Conditional Formula (7) is advantageous from the viewpoint of shortening the total length of the lens system at the telephoto end. In addition, configuring the zoom lens such that the value of D56w/D56t is not less than the lower limit defined in Conditional Formula (7) is advantageous from the viewpoint prevents the refractive power of the fifth lens group G5 from becoming excessively strong, which is advantageous from the viewpoints of suppressing astigmatism, preventing the diameter of lenses within the sixth lens group G6 from increasing, and suppressing adverse influence from being imparted on shading due to changes in incident angles of light rays into the image formation plane Sim becoming of opposite signs at the wide angle end and at the telephoto end. Note that more favorable properties can be obtained in the case that Conditional Formula (7-1) below is satisfied.

$$0.1 < D56w/D56t < 0.3 \quad (7)$$

$$0.15 < D56w/D56t < 0.25 \quad (7\text{-}1)$$

wherein D56w is the distance along the optical axis from the apex of the surface most toward the image side within the fifth lens group to the apex of the surface most toward the object side within the sixth lens group at the wide angle end, and D56t is the distance along the optical axis from the apex of the surface most toward the image side within the fifth lens group to the apex of the surface most toward the object side within the sixth lens group at the telephoto end.

In addition, it is preferable for the sixth lens group G6 to consist of a positive 6A lens L6A. If the number of lenses within the sixth lens group G6 increases and the thickness thereof increases, it will become necessary to increase the negative refractive power of the second lens group G2 or the fifth lens group G5. This will result in an increase in fluctuations of spherical aberration. Therefore, constituting the sixth lens group G6 by a single lens in this manner is advantageous from the viewpoint of suppressing fluctuations in spherical aberration.

Next, a zoom lens of a second embodiment will be described. The zoom lens of the second embodiment corresponds to Examples 1 through 6 to be described later. The zoom lens of the second embodiment is constituted by, in order from the object side to the image side: a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power. This zoom lens is configured such that the first lens group G1 constantly moves toward the object side, the distance between the first lens group G1 and the second lens group G2 constantly increases, the distance between the second lens group G2 and the third lens group G3 constantly decreases, the distance between the third lens group G3 and the fourth lens group G4 constantly changes, the distance between the fourth lens group G4 and the fifth lens G5 group constantly changes, and the distance between the fifth lens group G5 and the sixth lens group G6 constantly changes, when changing magnification from the wide angle end to the telephoto end. The first lens group G1 is constituted by, in order from the object side to the image side, a negative 1A lens L1A, a positive 1B lens L1B, and a positive 1C lens L1C. In addition, the zoom lens is configured such that Conditional Formula (1-2) below is satisfied. Note that the operative effects of each constituent element and Conditional Formula (1-2) are the same as those described above for the zoom lens of the first embodiment. Performance equivalent to that of the zoom lens of the first embodiment can be exhibited by this configuration as well.

$$39 < vd1A < 45 \quad (1\text{-}2)$$

In the case that the present zoom lens is to be utilized in an environment in which the zoom lens is likely to be damaged, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the zoom lens of the present disclosure will be described.

First, the zoom lens of Example 1 will be described. FIG. 1 is a collection of sectional diagrams that illustrate the lens configuration of the zoom lens of Example 1. Note that in FIG. 1 and FIGS. 2 through 8 that correspond to Examples 2 through 8 to be described later, the left side is the object side, the right side is the image side, and the aperture stops St in the drawings do not necessarily represent the size or the shape thereof, but the position thereof along the optical axis Z.

In the zoom lens of Example 1, the first lens group G1 is constituted by three lenses, which are lenses L1A through L1C, the second lens group G2 is constituted by five lenses, which are lenses L2A through L2E, the third lens group G3 is constituted by five lenses, which are lenses L3A through L3E, the fourth lens group G4 is constituted by four lenses, which are lenses L4A through L4D, the fifth lens group G5 is constituted by three lenses, which are lenses L5A through L5C, and the sixth lens group G6 is constituted by one lens, which is a lens L6A.

The second lens group G2 is constituted by, in order from the object side to the image side, a 2F lens group G2F and a 2R lens group G2R. The 2F lens group G2F is constituted by a cemented lens, formed by cementing a positive lens L2A and a negative lens L2B, provided in this order from the object side to the image side, together. The 2R lens group G2R is constituted by, in order from the object side to the image side, a cemented lens, formed by cementing a negative lens L2C and a positive lens L2D together, and a negative single lens L2E.

Basic lens data are shown in Table 1, data related to various items are shown in Table 2, and data related to the distances among movable surfaces are shown in Table 3, for the zoom lens of Example 1. In the following description, the meanings of the symbols in the tables will be described for Example 1. The meanings of the symbols are basically the same for Examples 2 through 8.

In the lens data of Table 1, surface numbers that sequentially increase from the object side to the image side, with the surface of the constituent element at the most object side designated as first, are shown in the column "Surface Number". The radii of curvature of ith surfaces are shown in the column of "Radius of Curvature", the distances along the optical axis Z between each surface and a next surface are shown in the column "Distance". The refractive indices of each optical element with respect to the d line (wavelength: 587.6 nm) are shown in the column nd. The Abbe's numbers of each optical element with respect to the d line (wavelength: 587.6 nm) are shown in the column vd. The partial dispersion ratio of each optical element is shown in the column "θgF".

Note that the partial dispersion ratio θgF is represented by the formula below.

$$\theta gF=(ng-nF)/(nF-nC)$$

wherein ng is the refractive index with respect to the g line, nF is the refractive index with respect to the F line, and nC is the refractive index with respect to the C line.

Here, the signs of the radii of curvature are positive in cases that the surface shape is convex toward the object side, and negative in cases that the surface shape is convex toward the image side. The aperture stop St and the optical member PP are also included in the basic lens data. Text reading "(aperture stop)" is indicated along with a surface number in the column of the surface numbers at the surface corresponding to the aperture stop. In addition, DD [surface number] is indicated in the column "Distance" for distances that change while changing magnification. The numerical values corresponding to DD [surface number] are shown in Table 3.

Table 2 shows the values of the zoom magnification rates of the entire system, the focal lengths "f", the F numbers "F No.", and the full angles of view "2ω" at the wide angle end, at an intermediate position, and at the telephoto end, respectively, as the data related to various items.

In the basic lens data, the data related to various items, and the data related to the distances among movable surfaces, mm are used as the units for lengths and degrees are used as the units for angles. However, it is possible for optical systems to be proportionately enlarged or proportionately reduced and utilized. Therefore, other appropriate units may be used.

TABLE 1

Example 1: Lens Data

| Surface Number | Radius of Curvature | Distance | nd | vd | θgF |
|---|---|---|---|---|---|
| 1 | 269.48203 | 2.220 | 1.83481 | 42.72 | 0.56486 |
| 2 | 107.65000 | 8.450 | 1.49700 | 81.54 | 0.53748 |
| 3 | −666.67333 | 0.150 | | | |
| 4 | 96.62397 | 7.950 | 1.43875 | 94.66 | 0.53402 |
| 5 | ∞ | DD [5] | | | |
| 6 | −208.69230 | 3.690 | 1.60562 | 43.71 | 0.57214 |
| 7 | −38.62300 | 1.000 | 1.75500 | 52.32 | 0.54765 |
| 8 | −78.91650 | 2.300 | | | |
| 9 | −167.21335 | 1.010 | 1.59522 | 67.73 | 0.54426 |
| 10 | 25.00500 | 3.090 | 1.78470 | 26.29 | 0.61360 |
| 11 | 44.82826 | 2.870 | | | |
| 12 | −69.05525 | 1.000 | 1.81600 | 46.62 | 0.55682 |
| 13 | 193.37055 | DD [13] | | | |
| 14 | 71.43178 | 5.720 | 1.58913 | 61.13 | 0.54067 |
| 15 | −44.45211 | 0.150 | | | |
| 16 | 39.58695 | 6.530 | 1.49700 | 81.54 | 0.53748 |
| 17 | −33.11400 | 1.000 | 1.90043 | 37.37 | 0.57720 |
| 18 | 139.34617 | 0.180 | | | |
| 19 | 28.83700 | 6.700 | 1.58267 | 46.42 | 0.56716 |
| 20 | −28.83700 | 1.000 | 1.51742 | 52.43 | 0.55649 |
| 21 | 21.27628 | 2.780 | | | |
| 22 (stop) | ∞ | DD [22] | | | |
| 23 | 49.78064 | 4.670 | 1.49700 | 81.54 | 0.53748 |
| 24 | −56.44194 | 0.330 | | | |
| 25 | −40.48697 | 1.000 | 1.83481 | 42.72 | 0.56486 |
| 26 | −448.89591 | 0.170 | | | |
| 27 | 40.52272 | 1.010 | 1.69700 | 48.52 | 0.55889 |
| 28 | 20.75000 | 4.300 | 1.51742 | 52.43 | 0.55649 |
| 29 | −43.73001 | DD [29] | | | |
| 30 | 92.44720 | 1.000 | 1.61800 | 63.33 | 0.54414 |
| 31 | 16.39421 | 2.630 | | | |
| 32 | ∞ | 1.010 | 1.49700 | 81.54 | 0.53748 |
| 33 | 14.90900 | 4.450 | 1.69350 | 53.20 | 0.54731 |
| 34 | 53.22030 | DD [34] | | | |
| 35 | −249.66626 | 2.910 | 1.54072 | 47.23 | 0.56511 |

TABLE 1-continued

Example 1: Lens Data

| Surface Number | Radius of Curvature | Distance | nd | vd | θgF |
|---|---|---|---|---|---|
| 36 | −49.77001 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 2

Example 1: Items (d line)

| | Wide Angle | Intermediate | Telephoto |
|---|---|---|---|
| Zoom Ratio | 1.0 | 1.7 | 3.8 |
| f | 102.873 | 178.159 | 387.872 |
| FNo. | 4.62 | 4.79 | 5.78 |
| 2ω (°) | 15.6 | 9.0 | 4.2 |

TABLE 3

Example 1: Distances Among Movable Surfaces

| | Wide Angle | Intermediate | Telephoto |
|---|---|---|---|
| DD [5] | 47.912 | 84.375 | 109.566 |
| DD [13] | 28.893 | 19.144 | 1.765 |
| DD [22] | 11.359 | 7.991 | 24.280 |
| DD [29] | 7.202 | 7.574 | 2.343 |
| DD [34] | 5.165 | 17.208 | 27.898 |
| DD [36] | 36.048 | 28.853 | 29.788 |

FIG. 9 is a collection of diagrams that illustrate various aberrations of the zoom lens of Example 1. The spherical aberration, the astigmatism, the distortion, and the lateral chromatic aberration of the zoom lens of Example 1 at the wide angle end are illustrated in this order from the left side of the drawing sheet at the upper portion of FIG. 5. The spherical aberration, the astigmatism, the distortion, and the lateral chromatic aberration of the zoom lens of Example 1 at an intermediate focal distance are illustrated in this order from the left side of the drawing sheet at the middle portion of FIG. 5. The spherical aberration, the astigmatism, the distortion, and the lateral chromatic aberration of the zoom lens of Example 1 at the telephoto end are illustrated in this order from the left side of the drawing sheet at the lower portion of FIG. 5. Each of the aberration diagrams show aberrations using the d line (wavelength: 587.6 nm) as a reference wavelength. The diagrams that illustrate spherical aberration show aberrations related to the d line (wavelength: 587.6 nm), aberrations related to the C line (wavelength: 656.3 nm), aberrations related to the F line (wavelength: 486.1 nm), and aberrations related to the g line (wavelength: 435.8 nm) as solid lines, long broken lines, short broken lines, and solid gray lines, respectively. In the diagrams that illustrate astigmatism, aberrations in the sagittal direction and aberrations in the tangential direction are indicated by solid lines and short broken lines, respectively. In the diagrams that illustrate lateral chromatic aberration, aberrations related to the C line (wavelength: 656.3 nm), aberrations related to the F line (wavelength: 486.1 nm), and aberrations related to the g line (wavelength: 435.8 nm) are shown as long broken lines, short broken lines, and solid gray lines, respectively. Note that these vertical aberrations are all for a state focused on an object at infinity. In the diagrams that illustrate spherical aberrations, "F No." denotes F values. In the other aberration diagrams, "ω" of denotes half angles of view.

The symbols, the meanings, and the manner in which the data are shown in the description of Example 1 above are the same for the following Examples to be described later, unless particularly noted. Therefore, redundant descriptions thereof will be omitted below.

Next, a zoom lens according to Example 2 will be described. FIG. 2 is a collection of sectional diagrams that illustrate the lens configuration of the zoom lens of Example 2. The number of lenses in each lens group within the zoom lens of Example 2 is the same as those for Example 1. Basic lens data are shown in Table 4, data related to various items are shown in Table 5, data related to the distances among movable surfaces are shown in Table 6, and various aberrations are illustrated in FIG. 10 for the zoom lens of Example 2.

TABLE 4

Example 2: Lens Data

| Surface Number | Radius of Curvature | Distance | nd | vd | θgF |
|---|---|---|---|---|---|
| 1 | 258.99426 | 2.220 | 1.83481 | 42.72 | 0.56486 |
| 2 | 105.99457 | 8.370 | 1.49700 | 81.54 | 0.53748 |
| 3 | −813.40013 | 0.150 | | | |
| 4 | 96.96234 | 8.250 | 1.43875 | 94.66 | 0.53402 |
| 5 | −12541.90626 | DD [5] | | | |
| 6 | −228.16128 | 3.720 | 1.60562 | 43.71 | 0.57214 |
| 7 | −38.90795 | 1.000 | 1.75500 | 52.32 | 0.54765 |
| 8 | −80.70102 | 2.300 | | | |
| 9 | −168.51961 | 1.010 | 1.59522 | 67.73 | 0.54426 |
| 10 | 24.91505 | 3.114 | 1.78470 | 26.29 | 0.61360 |
| 11 | 44.46548 | 2.958 | | | |
| 12 | −68.97092 | 1.000 | 1.81600 | 46.62 | 0.55682 |
| 13 | 198.22555 | DD [13] | | | |
| 14 | 70.13675 | 5.340 | 1.58913 | 61.13 | 0.54067 |
| 15 | −44.50451 | 0.150 | | | |
| 16 | 38.68170 | 6.653 | 1.49700 | 81.54 | 0.53748 |
| 17 | −33.05588 | 1.000 | 1.90043 | 37.37 | 0.57720 |
| 18 | 138.23933 | 0.668 | | | |
| 19 | 29.56207 | 6.760 | 1.58267 | 46.42 | 0.56716 |
| 20 | −27.52545 | 1.000 | 1.51742 | 52.43 | 0.55649 |
| 21 | 21.28674 | 2.738 | | | |
| 22 (stop) | ∞ | DD [22] | | | |
| 23 | 51.18087 | 3.962 | 1.49700 | 81.54 | 0.53748 |
| 24 | −58.76135 | 0.287 | | | |
| 25 | −41.01946 | 1.000 | 1.83481 | 42.72 | 0.56486 |
| 26 | −442.07391 | 0.150 | | | |
| 27 | 40.21747 | 1.010 | 1.69700 | 48.52 | 0.55889 |
| 28 | 20.72664 | 4.266 | 1.51742 | 52.43 | 0.55649 |
| 29 | −43.41757 | DD [29] | | | |
| 30 | 117.47452 | 1.000 | 1.61800 | 63.33 | 0.54414 |
| 31 | 16.99748 | 2.597 | | | |
| 32 | 274.37374 | 1.010 | 1.49700 | 81.54 | 0.53748 |
| 33 | 15.00523 | 4.204 | 1.69350 | 53.20 | 0.54731 |
| 34 | 46.29321 | DD [34] | | | |
| 35 | −252.89772 | 3.324 | 1.54072 | 47.23 | 0.56511 |
| 36 | −48.70676 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 5

Example 2: Items (d line)

| | Wide Angle | Intermediate | Telephoto |
|---|---|---|---|
| Zoom Ratio | 1.0 | 1.7 | 3.8 |
| f | 102.898 | 178.202 | 387.966 |

TABLE 5-continued

Example 2: Items (d line)

| | Wide Angle | Intermediate | Telephoto |
|---|---|---|---|
| FNo. | 4.62 | 4.82 | 5.78 |
| 2ω (°) | 15.6 | 9.0 | 4.2 |

TABLE 6

Example 2: Distances Among Movable Surfaces

| | Wide Angle | Intermediate | Telephoto |
|---|---|---|---|
| DD [5] | 47.985 | 84.100 | 110.054 |
| DD [13] | 29.209 | 19.050 | 1.658 |
| DD [22] | 11.087 | 7.995 | 23.693 |
| DD [29] | 7.254 | 7.894 | 2.707 |
| DD [34] | 5.281 | 16.955 | 27.046 |
| DD [36] | 35.935 | 29.107 | 30.587 |

Next, a zoom lens according to Example 3 will be described. FIG. 3 is a collection of sectional diagrams that illustrate the lens configuration of the zoom lens of Example 3. The number of lenses in each lens group within the zoom lens of Example 3 is the same as those for Example 1. Basic lens data are shown in Table 7, data related to various items are shown in Table 8, data related to the distances among movable surfaces are shown in Table 9, and various aberrations are illustrated in FIG. 11 for the zoom lens of Example 3.

TABLE 7

Example 3: Lens Data

| Surface Number | Radius of Curvature | Distance | nd | vd | θgF |
|---|---|---|---|---|---|
| 1 | 262.40932 | 2.220 | 1.83481 | 42.72 | 0.56486 |
| 2 | 105.54031 | 8.384 | 1.49700 | 81.54 | 0.53748 |
| 3 | −733.03668 | 0.150 | | | |
| 4 | 95.96727 | 7.808 | 1.43387 | 95.18 | 0.53733 |
| 5 | −15644.45936 | DD [5] | | | |
| 6 | −228.28533 | 3.522 | 1.58267 | 46.42 | 0.56716 |
| 7 | −38.72547 | 0.900 | 1.69680 | 55.53 | 0.54341 |
| 8 | −85.18699 | 2.301 | | | |
| 9 | −172.24235 | 0.910 | 1.59522 | 67.73 | 0.54426 |
| 10 | 23.88538 | 3.576 | 1.78470 | 26.29 | 0.61360 |
| 11 | 46.63101 | 2.720 | | | |
| 12 | −78.62778 | 0.900 | 1.83481 | 42.72 | 0.56486 |
| 13 | 120.57303 | DD [13] | | | |
| 14 | 62.51644 | 5.042 | 1.60311 | 60.64 | 0.54148 |
| 15 | −44.95879 | 0.150 | | | |
| 16 | 37.70765 | 6.383 | 1.49700 | 81.54 | 0.53748 |
| 17 | −32.17618 | 0.800 | 1.90043 | 37.37 | 0.57720 |
| 18 | 122.86192 | 1.690 | | | |
| 19 | 28.87948 | 6.260 | 1.58267 | 46.42 | 0.56716 |
| 20 | −26.63471 | 0.800 | 1.51742 | 52.43 | 0.55649 |
| 21 | 20.72606 | 2.745 | | | |
| 22 (stop) | ∞ | DD [22] | | | |
| 23 | 50.07194 | 2.519 | 1.49700 | 81.54 | 0.53748 |
| 24 | −74.92532 | 0.437 | | | |
| 25 | −40.58758 | 0.700 | 1.72000 | 41.98 | 0.57299 |
| 26 | −885.62981 | 0.174 | | | |
| 27 | 38.59955 | 0.710 | 1.72000 | 43.69 | 0.56995 |
| 28 | 20.36324 | 4.380 | 1.51742 | 52.43 | 0.55649 |
| 29 | −42.13900 | DD [29] | | | |
| 30 | 133.32611 | 0.700 | 1.61800 | 63.33 | 0.54414 |
| 31 | 17.23714 | 2.422 | | | |
| 32 | 207.21027 | 0.710 | 1.49700 | 81.54 | 0.53748 |
| 33 | 14.95626 | 3.161 | 1.69700 | 48.52 | 0.55889 |
| 34 | 49.34035 | DD [34] | | | |
| 35 | −251.94791 | 2.500 | 1.51742 | 52.43 | 0.55649 |
| 36 | −51.99972 | DD [36] | | | |

TABLE 7-continued

Example 3: Lens Data

| Surface Number | Radius of Curvature | Distance | nd | vd | θgF |
|---|---|---|---|---|---|
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 8

Example 3: Items (d line)

| | Wide Angle | Intermediate | Telephoto |
|---|---|---|---|
| Zoom Ratio | 1.0 | 1.7 | 3.8 |
| f | 102.890 | 178.188 | 387.935 |
| FNo. | 4.62 | 4.72 | 5.78 |
| 2ω (°) | 15.6 | 9.0 | 4.2 |

TABLE 9

Example 3: Distances Among Movable Surfaces

| | Wide Angle | Intermediate | Telephoto |
|---|---|---|---|
| DD [5] | 48.275 | 84.574 | 110.603 |
| DD [13] | 28.061 | 16.145 | 1.643 |
| DD [22] | 11.932 | 7.999 | 24.129 |
| DD [29] | 6.601 | 8.569 | 2.281 |
| DD [34] | 5.219 | 15.525 | 30.943 |
| DD [36] | 38.604 | 30.180 | 28.730 |

Next, a zoom lens according to Example 4 will be described. FIG. 4 is a collection of sectional diagrams that illustrate the lens configuration of the zoom lens of Example 4. The number of lenses in each lens group within the zoom lens of Example 4 is the same as those for Example 1. Basic lens data are shown in Table 10, data related to various items are shown in Table 11, data related to the distances among movable surfaces are shown in Table 12, and various aberrations are illustrated in FIG. 12 for the zoom lens of Example 4.

TABLE 10

Example 4: Lens Data

| Surface Number | Radius of Curvature | Distance | nd | vd | θgF |
|---|---|---|---|---|---|
| 1 | 261.69144 | 2.220 | 1.83481 | 42.72 | 0.56486 |
| 2 | 107.03880 | 9.000 | 1.49700 | 81.54 | 0.53748 |
| 3 | −1029.68373 | 0.150 | | | |
| 4 | 97.17921 | 8.700 | 1.43875 | 94.94 | 0.53433 |
| 5 | −32440.75797 | DD [5] | | | |
| 6 | −405.23012 | 3.939 | 1.59551 | 39.24 | 0.58043 |
| 7 | −46.61633 | 1.000 | 1.72916 | 54.68 | 0.54451 |
| 8 | −99.92995 | 2.800 | | | |
| 9 | −613.56320 | 1.010 | 1.59522 | 67.73 | 0.54426 |
| 10 | 29.81511 | 3.000 | 1.84666 | 23.78 | 0.62054 |
| 11 | 46.91136 | 3.549 | | | |
| 12 | −71.42841 | 1.000 | 1.83481 | 42.72 | 0.56486 |
| 13 | 173.10115 | DD [13] | | | |
| 14 | 81.36754 | 5.121 | 1.64000 | 60.08 | 0.53704 |
| 15 | −58.05855 | 0.150 | | | |
| 16 | 35.63695 | 7.010 | 1.49700 | 81.54 | 0.53748 |
| 17 | −44.63558 | 1.000 | 1.91082 | 35.25 | 0.58224 |
| 18 | 146.58133 | 2.000 | | | |
| 19 | 43.19398 | 7.010 | 1.63980 | 34.47 | 0.59233 |
| 20 | −24.82487 | 1.000 | 1.59551 | 39.24 | 0.58043 |
| 21 | 25.47397 | 2.681 | | | |

TABLE 10-continued

Example 4: Lens Data

| Surface Number | Radius of Curvature | Distance | nd | vd | θgF |
|---|---|---|---|---|---|
| 22 (stop) | ∞ | DD [22] | | | |
| 23 | 53.92651 | 5.000 | 1.49700 | 81.54 | 0.53748 |
| 24 | −78.38535 | 0.803 | | | |
| 25 | −33.76811 | 1.000 | 1.60562 | 43.71 | 0.57214 |
| 26 | −100.32701 | 1.500 | | | |
| 27 | 43.03999 | 1.010 | 1.80100 | 34.97 | 0.58642 |
| 28 | 22.43546 | 5.000 | 1.51742 | 52.43 | 0.55649 |
| 29 | −39.11154 | DD [29] | | | |
| 30 | 117.68560 | 1.000 | 1.61800 | 63.33 | 0.54414 |
| 31 | 17.30264 | 2.500 | | | |
| 32 | −156.38439 | 1.010 | 1.49700 | 81.54 | 0.53748 |
| 33 | 15.76729 | 4.276 | 1.66672 | 48.32 | 0.56101 |
| 34 | 104.68410 | DD [34] | | | |
| 35 | 660.95421 | 3.000 | 1.51742 | 52.43 | 0.55649 |
| 36 | −79.06941 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 11

Example 4: Items (d line)

| | Wide Angle | Intermediate | Telephoto |
|---|---|---|---|
| Zoom Ratio | 1.0 | 1.7 | 3.8 |
| f | 102.916 | 178.233 | 388.034 |
| FNo. | 4.12 | 4.15 | 5.77 |
| 2ω (°) | 15.6 | 9.0 | 4.2 |

TABLE 12

Example 4: Distances Among Movable Surfaces

| | Wide Angle | Intermediate | Telephoto |
|---|---|---|---|
| DD [5] | 47.161 | 87.165 | 104.964 |
| DD [13] | 32.187 | 21.866 | 1.653 |
| DD [22] | 10.237 | 11.976 | 38.739 |
| DD [29] | 7.014 | 5.989 | 2.291 |
| DD [34] | 4.801 | 11.403 | 26.526 |
| DD [36] | 34.730 | 29.228 | 30.955 |

Next, a zoom lens according to Example 5 will be described. FIG. 5 is a collection of sectional diagrams that illustrate the lens configuration of the zoom lens of Example 5. The number of lenses in each lens group within the zoom lens of Example 5 is the same as those for Example 1. Basic lens data are shown in Table 13, data related to various items are shown in Table 14, data related to the distances among movable surfaces are shown in Table 15, and various aberrations are illustrated in FIG. 13 for the zoom lens of Example 5.

TABLE 13

Example 5: Lens Data

| Surface Number | Radius of Curvature | Distance | nd | vd | θgF |
|---|---|---|---|---|---|
| 1 | 246.81462 | 2.220 | 1.83481 | 42.72 | 0.56486 |
| 2 | 107.73783 | 8.041 | 1.49700 | 81.54 | 0.53748 |
| 3 | −1178.90109 | 0.150 | | | |
| 4 | 100.44029 | 7.588 | 1.43875 | 94.94 | 0.53433 |
| 5 | 8727.25727 | DD [5] | | | |
| 6 | 3024.98867 | 3.778 | 1.62280 | 57.05 | 0.54640 |

TABLE 13-continued

Example 5: Lens Data

| Surface Number | Radius of Curvature | Distance | nd | νd | θgF |
|---|---|---|---|---|---|
| 7 | −45.65466 | 1.000 | 1.71299 | 53.87 | 0.54587 |
| 8 | −116.96443 | 2.300 | | | |
| 9 | −238.80952 | 1.010 | 1.72916 | 54.68 | 0.54451 |
| 10 | 23.51336 | 3.723 | 1.78472 | 25.68 | 0.61621 |
| 11 | 55.94830 | 2.570 | | | |
| 12 | −68.95561 | 1.000 | 1.81600 | 46.62 | 0.55682 |
| 13 | 274.76383 | DD [13] | | | |
| 14 | 81.51290 | 4.680 | 1.69680 | 55.53 | 0.54341 |
| 15 | −51.95789 | 0.150 | | | |
| 16 | 37.45190 | 6.447 | 1.49700 | 81.54 | 0.53748 |
| 17 | −35.34266 | 1.000 | 1.90043 | 37.37 | 0.57720 |
| 18 | 95.27503 | 2.000 | | | |
| 19 | 30.80965 | 6.418 | 1.65412 | 39.68 | 0.57378 |
| 20 | −29.75104 | 1.000 | 1.56732 | 42.82 | 0.57309 |
| 21 | 21.59194 | 2.620 | | | |
| 22 (stop) | ∞ | DD [22] | | | |
| 23 | 43.75714 | 4.404 | 1.53775 | 74.70 | 0.53936 |
| 24 | −56.69385 | 0.264 | | | |
| 25 | −40.80586 | 1.000 | 1.83400 | 37.16 | 0.57759 |
| 26 | 1196.79400 | 0.150 | | | |
| 27 | 46.19305 | 1.010 | 1.69680 | 55.53 | 0.54341 |
| 28 | 21.65972 | 4.255 | 1.51742 | 52.43 | 0.55649 |
| 29 | −39.14434 | DD [29] | | | |
| 30 | 168.89036 | 1.000 | 1.61800 | 63.33 | 0.54414 |
| 31 | 18.06237 | 1.718 | | | |
| 32 | 74.24649 | 1.010 | 1.49700 | 81.54 | 0.53748 |
| 33 | 14.51063 | 3.101 | 1.69700 | 48.52 | 0.55889 |
| 34 | 31.80102 | DD [34] | | | |
| 35 | −250.02232 | 3.000 | 1.58144 | 40.75 | 0.57757 |
| 36 | −49.91039 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 14

Example 5: Items (d line)

| | Wide Angle | Intermediate | Telephoto |
|---|---|---|---|
| Zoom Ratio | 1.0 | 1.7 | 3.8 |
| f | 102.913 | 178.227 | 388.020 |
| FNo. | 4.62 | 4.62 | 5.78 |
| 2ω (°) | 15.4 | 8.8 | 4.2 |

TABLE 15

Example 5: Distances Among Movable Surfaces

| | Wide Angle | Intermediate | Telephoto |
|---|---|---|---|
| DD [5] | 49.840 | 89.688 | 115.040 |
| DD [13] | 30.478 | 18.097 | 1.637 |
| DD [22] | 9.119 | 8.194 | 22.721 |
| DD [29] | 7.515 | 8.383 | 2.292 |
| DD [34] | 5.566 | 11.100 | 28.523 |
| DD [36] | 35.737 | 30.040 | 29.656 |

Next, a zoom lens according to Example 6 will be described. FIG. 6 is a collection of sectional diagrams that illustrate the lens configuration of the zoom lens of Example 6. The number of lenses in each lens group within the zoom lens of Example 6 is the same as those for Example 1. Basic lens data are shown in Table 16, data related to various items are shown in Table 17, data related to the distances among movable surfaces are shown in Table 18, and various aberrations are illustrated in FIG. 14 for the zoom lens of Example 6.

TABLE 16

Example 6: Lens Data

| Surface Number | Radius of Curvature | Distance | nd | νd | θgF |
|---|---|---|---|---|---|
| 1 | 245.80950 | 2.220 | 1.83481 | 42.72 | 0.56486 |
| 2 | 107.21876 | 8.092 | 1.49700 | 81.54 | 0.53748 |
| 3 | −1141.17154 | 0.100 | | | |
| 4 | 100.21881 | 7.654 | 1.43875 | 94.94 | 0.53433 |
| 5 | 33201.75554 | DD [5] | | | |
| 6 | −1239.59270 | 3.888 | 1.65160 | 58.55 | 0.54267 |
| 7 | −41.76492 | 1.000 | 1.72916 | 54.68 | 0.54451 |
| 8 | −115.23571 | 2.425 | | | |
| 9 | −199.35565 | 1.010 | 1.72916 | 54.68 | 0.54451 |
| 10 | 23.60406 | 3.677 | 1.80518 | 25.42 | 0.61616 |
| 11 | 54.68729 | 2.600 | | | |
| 12 | −69.50409 | 1.000 | 1.78800 | 47.37 | 0.55598 |
| 13 | 258.80679 | DD [13] | | | |
| 14 | 85.79751 | 4.693 | 1.69680 | 55.53 | 0.54341 |
| 15 | −51.09839 | 0.100 | | | |
| 16 | 38.11402 | 6.458 | 1.49700 | 81.54 | 0.53748 |
| 17 | −36.18138 | 1.000 | 1.90043 | 37.37 | 0.57720 |
| 18 | 103.37686 | 2.000 | | | |
| 19 | 29.99892 | 6.510 | 1.65412 | 39.68 | 0.57378 |
| 20 | −31.15673 | 1.000 | 1.57501 | 41.50 | 0.57672 |
| 21 | 21.50234 | 3.015 | | | |
| 22 (stop) | ∞ | DD [22] | | | |
| 23 | 50.39261 | 3.623 | 1.59522 | 67.73 | 0.54426 |
| 24 | −62.84452 | 0.576 | | | |
| 25 | −39.96783 | 1.000 | 1.83400 | 37.16 | 0.57759 |
| 26 | 415.94560 | 0.100 | | | |
| 27 | 41.91854 | 1.010 | 1.67790 | 55.34 | 0.54726 |
| 28 | 20.11580 | 4.530 | 1.51742 | 52.43 | 0.55649 |
| 29 | −37.22510 | DD [29] | | | |
| 30 | 175.42627 | 1.000 | 1.61800 | 63.33 | 0.54414 |
| 31 | 18.81896 | 1.473 | | | |
| 32 | 75.02252 | 1.010 | 1.49700 | 81.54 | 0.53748 |
| 33 | 13.84323 | 3.383 | 1.61772 | 49.81 | 0.56035 |
| 34 | 34.75715 | DD [34] | | | |
| 35 | −250.01927 | 3.000 | 1.58144 | 40.75 | 0.57757 |
| 36 | −50.02712 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 17

Example 6: Items (d line)

| | Wide Angle | Intermediate | Telephoto |
|---|---|---|---|
| Zoom Ratio | 1.0 | 1.7 | 3.8 |
| f | 102.923 | 178.245 | 388.060 |
| FNo. | 4.62 | 4.62 | 5.78 |
| 2ω (°) | 15.4 | 8.8 | 4.2 |

TABLE 18

Example 6: Distances Among Movable Surfaces

| | Wide Angle | Intermediate | Telephoto |
|---|---|---|---|
| DD [5] | 49.385 | 88.916 | 113.805 |
| DD [13] | 29.808 | 17.927 | 1.644 |
| DD [22] | 9.485 | 8.115 | 22.489 |
| DD [29] | 7.405 | 8.241 | 2.295 |
| DD [34] | 5.476 | 11.478 | 28.535 |
| DD [36] | 35.816 | 30.022 | 29.729 |

Next, a zoom lens according to Example 7 will be described. FIG. 7 is a collection of sectional diagrams that illustrate the lens configuration of the zoom lens of Example 7. The number of lenses in each lens group within the zoom lens of Example 7 is the same as those for Example 1, except that a third lens group G3 is constituted by six lenses, which are lenses L3A through L3F, and a fourth lens group G4 is constituted by three lenses, which are lenses L4A through L4C. Basic lens data are shown in Table 19, data related to various items are shown in Table 20, data related to the distances among movable surfaces are shown in Table 21, and various aberrations are illustrated in FIG. 15 for the zoom lens of Example 7.

TABLE 19

Example 7: Lens Data

| Surface Number | Radius of Curvature | Distance | nd | vd | θgF |
|---|---|---|---|---|---|
| 1 | 205.08632 | 2.220 | 1.81600 | 46.62 | 0.55682 |
| 2 | 93.67079 | 8.130 | 1.49700 | 81.54 | 0.53748 |
| 3 | 2342.19599 | 0.100 | | | |
| 4 | 98.54896 | 7.622 | 1.49700 | 81.54 | 0.53748 |
| 5 | 3673.27806 | DD [5] | | | |
| 6 | −289.23356 | 4.022 | 1.74000 | 28.30 | 0.60790 |
| 7 | −36.10761 | 1.000 | 1.80000 | 29.84 | 0.60178 |
| 8 | −110.09634 | 0.800 | | | |
| 9 | 645.89060 | 1.010 | 1.81600 | 46.62 | 0.55682 |
| 10 | 29.78983 | 2.851 | 1.84666 | 23.78 | 0.62054 |
| 11 | 54.70693 | 2.724 | | | |
| 12 | −68.62504 | 1.000 | 1.78800 | 47.37 | 0.55598 |
| 13 | 182.50252 | DD [13] | | | |
| 14 | 99.12755 | 4.088 | 1.49700 | 81.54 | 0.53748 |
| 15 | −62.62395 | 0.100 | | | |
| 16 | 54.04337 | 3.841 | 1.68893 | 31.07 | 0.60041 |
| 17 | −167.10465 | 0.100 | | | |
| 18 | 31.95590 | 5.235 | 1.43875 | 94.94 | 0.53433 |
| 19 | −71.94599 | 1.000 | 2.00069 | 25.46 | 0.61364 |
| 20 | 35.97289 | 0.250 | | | |
| 21 | 21.83290 | 6.010 | 1.72342 | 37.95 | 0.58370 |
| 22 | −1067.02913 | 1.000 | 1.60738 | 56.82 | 0.54840 |
| 23 | 18.31437 | 2.848 | | | |
| 24 (stop) | ∞ | DD [24] | | | |
| 25 | 35.66698 | 5.000 | 1.51742 | 52.43 | 0.55649 |
| 26 | 138.42208 | 1.000 | | | |
| 27 | 102.65914 | 5.008 | 1.51742 | 52.43 | 0.55649 |
| 28 | −22.15929 | 1.000 | 1.74400 | 44.79 | 0.56560 |
| 29 | −43.98564 | DD [29] | | | |
| 30 | 249.15741 | 1.000 | 1.72916 | 54.68 | 0.54451 |
| 31 | 18.44686 | 1.340 | | | |
| 32 | 51.46462 | 1.010 | 1.65160 | 58.55 | 0.54267 |
| 33 | 13.37706 | 3.323 | 1.83481 | 42.72 | 0.56486 |
| 34 | 30.11090 | DD [34] | | | |
| 35 | −186.41513 | 3.668 | 1.60342 | 38.03 | 0.58356 |
| 36 | −37.12873 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 20

Example 7: Items (d line)

| | Wide Angle | Intermediate | Telephoto |
|---|---|---|---|
| Zoom Ratio | 1.0 | 1.5 | 2.7 |
| f | 144.132 | 217.169 | 388.166 |
| FNo. | 4.62 | 5.01 | 5.79 |
| 2ω (°) | 10.8 | 7.4 | 4.0 |

TABLE 21

Example 7: Distances Among Movable Surfaces

| | Wide Angle | Intermediate | Telephoto |
|---|---|---|---|
| DD [5] | 69.227 | 91.984 | 109.320 |
| DD [13] | 17.784 | 15.481 | 1.451 |
| DD [24] | 6.777 | 6.731 | 28.472 |
| DD [29] | 10.181 | 6.252 | 1.493 |

TABLE 21-continued

Example 7: Distances Among Movable Surfaces

| | Wide Angle | Intermediate | Telephoto |
|---|---|---|---|
| DD [34] | 4.767 | 20.380 | 21.512 |
| DD [36] | 30.154 | 28.407 | 30.673 |

Next, a zoom lens according to Example 8 will be described. FIG. 8 is a collection of sectional diagrams that illustrate the lens configuration of the zoom lens of Example 8. The number of lenses in each lens group within the zoom lens of Example 8 is the same as those for Example 7. Basic lens data are shown in Table 22, data related to various items are shown in Table 23 data related to the distances among movable surfaces are shown in Table 24, and various aberrations are illustrated in FIG. 16 for the zoom lens of Example 8.

TABLE 22

Example 8: Lens Data

| Surface Number | Radius of Curvature | Distance | nd | vd | θgF |
|---|---|---|---|---|---|
| 1 | 212.35539 | 2.220 | 1.81600 | 46.62 | 0.55682 |
| 2 | 95.18081 | 8.438 | 1.49700 | 81.54 | 0.53748 |
| 3 | −5352.69979 | 0.100 | | | |
| 4 | 97.19575 | 7.794 | 1.49700 | 81.54 | 0.53748 |
| 5 | 3569.72565 | DD [5] | | | |
| 6 | −1035.11505 | 3.647 | 1.73800 | 32.26 | 0.58995 |
| 7 | −43.87339 | 1.000 | 1.80100 | 34.97 | 0.58642 |
| 8 | −192.33037 | 1.000 | | | |
| 9 | −798.53909 | 1.010 | 1.72916 | 54.68 | 0.54451 |
| 10 | 25.08611 | 3.212 | 1.80518 | 25.42 | 0.61616 |
| 11 | 47.70304 | 2.731 | | | |
| 12 | −77.43380 | 1.000 | 1.91082 | 35.25 | 0.58224 |
| 13 | 406.69358 | DD [13] | | | |
| 14 | 95.54044 | 4.039 | 1.49700 | 81.54 | 0.53748 |
| 15 | −60.88528 | 0.100 | | | |
| 16 | 54.73332 | 3.551 | 1.58144 | 40.75 | 0.57757 |
| 17 | −222.60779 | 0.100 | | | |
| 18 | 29.15355 | 5.233 | 1.49700 | 81.54 | 0.53748 |
| 19 | −84.20866 | 1.000 | 1.91650 | 31.60 | 0.59117 |
| 20 | 31.50556 | 0.250 | | | |
| 21 | 22.36049 | 5.250 | 1.71700 | 47.93 | 0.56062 |
| 22 | −70.12504 | 1.000 | 1.65160 | 58.55 | 0.54267 |
| 23 | 19.36813 | 2.705 | | | |
| 24 (stop) | ∞ | DD [24] | | | |
| 25 | 35.91871 | 2.799 | 1.51742 | 52.43 | 0.55649 |
| 26 | 156.71491 | 1.000 | | | |
| 27 | 86.24955 | 3.482 | 1.51742 | 52.43 | 0.55649 |
| 28 | −29.49271 | 1.000 | 1.61405 | 54.99 | 0.55092 |
| 29 | −110.87437 | DD [29] | | | |
| 30 | 228.50744 | 1.000 | 1.75500 | 52.32 | 0.54765 |
| 31 | 21.26842 | 2.600 | | | |
| 32 | 64.84575 | 1.010 | 1.61800 | 63.33 | 0.54414 |
| 33 | 16.32979 | 3.042 | 1.80400 | 46.58 | 0.55730 |
| 34 | 34.04170 | DD [34] | | | |
| 35 | 423.63050 | 4.553 | 1.78800 | 47.37 | 0.55598 |
| 36 | −54.10936 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 23

Example 8: Items (d line)

| | Wide Angle | Intermediate | Telephoto |
|---|---|---|---|
| Zoom Ratio | 1.0 | 1.5 | 2.7 |
| f | 144.115 | 217.143 | 388.119 |

TABLE 23-continued

Example 8: Items (d line)

| | Wide Angle | Intermediate | Telephoto |
|---|---|---|---|
| FNo. | 4.57 | 5.08 | 5.79 |
| 2ω (°) | 11.0 | 7.4 | 4.2 |

TABLE 24

Example 8: Distances Among Movable Surfaces

| | Wide Angle | Intermediate | Telephoto |
|---|---|---|---|
| DD [5] | 67.325 | 86.464 | 104.178 |
| DD [13] | 16.789 | 13.866 | 1.475 |
| DD [24] | 7.697 | 3.807 | 27.092 |
| DD [29] | 12.949 | 8.729 | 1.496 |
| DD [34] | 7.996 | 30.300 | 36.010 |
| DD [36] | 28.165 | 28.165 | 28.165 |

Table 25 shows values corresponding to Conditional Formulae (1) through (7) for the zoom lenses of Examples 1 through 8. Note that all of the Examples use the d line as a reference wavelength, and the values shown in Table 25 are those with respect to the reference wavelength.

TABLE 25

| Formula | Condition | Example 1 | Example 2 | Example 3 | Example 4 | Example 5 | Example 6 | Example 7 | Example 8 |
|---|---|---|---|---|---|---|---|---|---|
| (1) | vd1A | 42.7 | 42.7 | 42.7 | 42.7 | 42.7 | 42.7 | 46.6 | 46.6 |
| (2) | vd3ave | 63.0 | 63.0 | 62.9 | 58.7 | 58.9 | 58.9 | 61.4 | 62.9 |
| (3) | f3A/f3 | 0.961 | 0.962 | 0.929 | 0.947 | 0.901 | 0.928 | 1.587 | 1.530 |
| (4) | f3/fC3A | −0.250 | −0.234 | −0.264 | −0.029 | −0.328 | −0.286 | −0.983 | −0.730 |
| (5) | f3/f1 | 0.258 | 0.254 | 0.247 | 0.285 | 0.255 | 0.253 | 0.258 | 0.273 |
| (6) | X3/X1 | 0.415 | 0.415 | 0.398 | 0.605 | 0.410 | 0.407 | 0.560 | 0.625 |
| (7) | D56w/D56t | 0.185 | 0.195 | 0.169 | 0.181 | 0.195 | 0.192 | 0.222 | 0.222 |

Based on the data above, it can be understood that all of the zoom lenses of Examples 1 through 8 satisfy Conditional Formulae (1) through (7), and that these zoom lenses are those in which various aberrations are favorably corrected.

Figure 17:
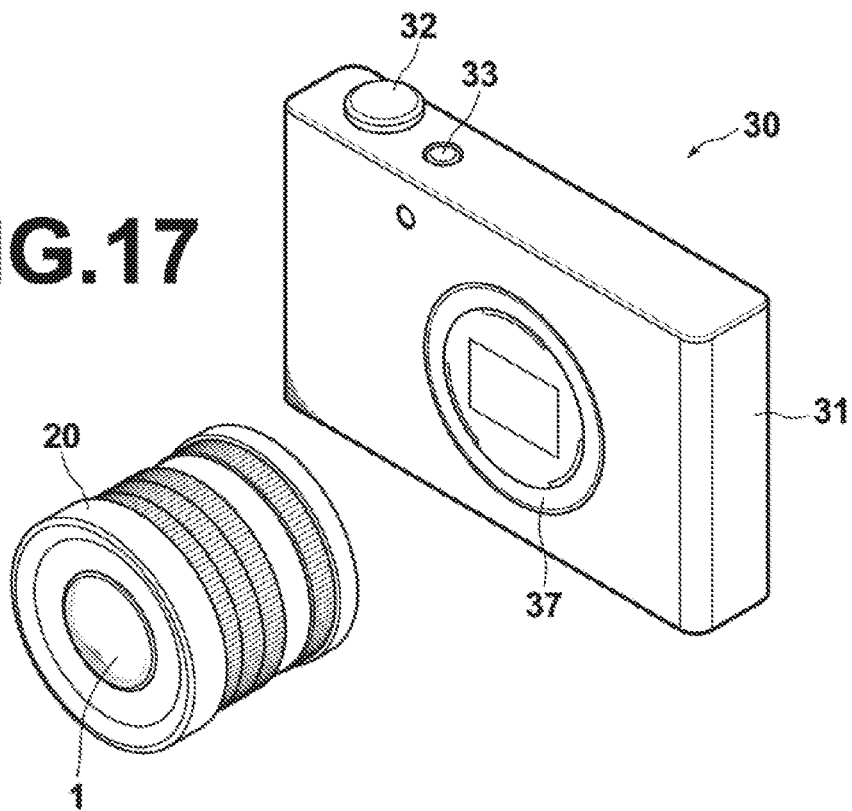
FIG. 17 is a perspective view that illustrates the front side of an imaging apparatus as an embodiment of the present disclosure.
Figure 18:
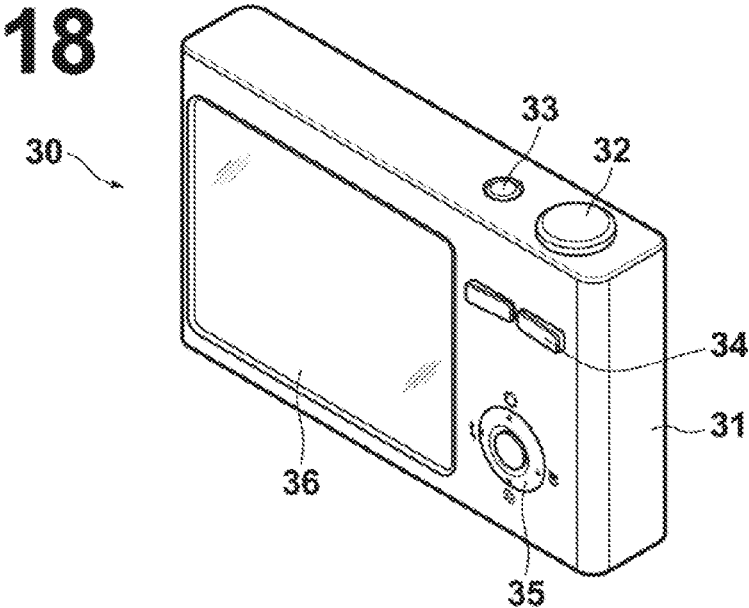
FIG. 18 is a perspective view that illustrates the rear side of the imaging apparatus illustrated in FIG. 17.

Next, an imaging apparatus according to an embodiment of the present disclosure will be described with reference to FIG. 17 and FIG. 18. FIG. 17 and FIG. 18 respectively are perspective views of the front and the rear of a camera 30. The camera 30 is a non reflex (so called mirrorless) digital camera, onto which an exchangeable lens 20 is interchangeably mounted. The exchangeable lens 20 is a zoom lens 1 according to an embodiment of the present disclosure housed in a lens barrel.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD that receives images of subjects formed by the exchangeable lens 20 and outputs image signals corresponding to the images, a signal processing circuit (not shown) that processes the image signals output by the imaging element to generate images, and a recording medium (not shown) for recording the generated images, are provided within the camera body 31. In this camera 30, photography of a still image corresponding to a single frame or video imaging is enabled by pressing the shutter release button 32. Image data obtained by photography or video imaging are recorded in the recording medium.

The camera 30 of the present embodiment is equipped with the zoom lens 1 of the present disclosure. Therefore, the camera 30 is capable of obtaining images having high image quality.

The present disclosure has been described with reference to the embodiments and Examples thereof. However, the zoom lens of the present disclosure is not limited to the embodiments and Examples described above, and various modifications are possible. For example, the values of the radii of curvature of each lens, the distances among surfaces, the refractive indices, and the Abbe's numbers are not limited to those shown in the Examples above, and may be other values.

In addition, a non reflex digital camera was described as the embodiment of the imaging apparatus. However, the present disclosure is not limited to this application, and may be applied to other imaging apparatuses, such as a video camera, digital cameras other than those of the non reflex type, a cinematic camera, and a broadcast camera.

What is claimed is:

1. A zoom lens comprising only the following six lens groups with refractive power in order from an object side to an image side:
   a first lens group having a positive refractive power;
   a second lens group having a negative refractive power;
   a third lens group having a positive refractive power;
   a fourth lens group having a positive refractive power;
   a fifth lens group having a negative refractive power; and
   a sixth lens group having a positive refractive power;
   the first lens group moving toward the object side, a distance between the first lens group and the second lens group increasing, a distance between the second lens group and the third lens group decreasing, a distance between the third lens group and the fourth lens group changing, a distance between the fourth lens group and the fifth lens group changing, and a distance between the fifth lens group and the sixth lens group changing, when changing magnification from a wide angle end to a telephoto end;
   the first lens group comprising only the following three lenses with refractive power, in order from the object side to the image side: a negative 1A lens, a positive 1B lens, and a positive 1C lens;
   the third lens group having a 3-A positive lens most toward the object side therein;

Conditional Formula (1) below is satisfied:

$$39 < vd1A < 50 \tag{1}$$

wherein vd1A is an Abbe's number with respect to a d line of the 1A negative lens; and
Conditional Formula (2) below is satisfied:

$$50 < vd3ave < 70 \tag{2}$$

wherein vd3ave is an average Abbe's number with respect to a d line of the positive lenses within the third lens group.

2. The zoom lens as defined in claim 1, further comprising:
a stop positioned adjacent to the third lens group toward the image side thereof, and wherein:
the stop moves integrally with the third lens group when changing magnification.

3. The zoom lens as defined in claim 1, wherein:
the sixth lens group consists of a positive 6A lens.

4. The zoom lens as defined in claim 1, in which Conditional Formula (1-1) below is satisfied:

$$41 < vd1A < 48 \tag{1-1}$$

5. The zoom lens as defined in claim 1, in which Conditional Formula (2-1) below is satisfied:

$$55 < vd3ave < 65 \tag{2.1}$$

6. An imaging apparatus equipped with the zoom lens as defined in claim 1.

7. The zoom lens as defined in claim 1, in which Conditional Formula (3) below is satisfied:

$$0.6 < f3A/f3 < 1.9 \tag{3}$$

wherein f3A is a paraxial focal length with respect to a d line of the 3A positive lens, and f3 is the paraxial focal length with respect to the d line of the third lens group.

8. The zoom lens as defined in claim 1, wherein:
the third lens group has a 3A cemented lens, in which a positive lens and a negative lens provided in this order from the object side to the image side are cemented together, positioned at the image side of the 3A positive lens; and
Conditional Formula (4) below is satisfied:

$$-1.3 < f3/fC3A < 0 \tag{4}$$

wherein f3 is a paraxial focal length with respect to the d line of the third lens group, and fC3A is a paraxial focal length with respect to a d line of a 3A cemented lens.

9. The zoom lens as defined in claim 1, in which Conditional Formula (5) below is satisfied:

$$0.17 < f3/f1 < 0.35 \tag{5}$$

wherein f3 is the paraxial focal length with respect to the d line of the third lens group, and f1 is the paraxial focal length with respect to a d line of the first lens group.

10. The zoom lens as defined in claim 1, in which Conditional Formula (6) below is satisfied:

$$0.3 < X3/X1 < 0.8 \tag{6}$$

wherein X3 is an amount of displacement of the third lens group when changing magnification from the wide angle end to the telephoto end, and X1 is an amount of displacement of the first lens group when changing magnification from the wide angle end to the telephoto end.

11. The zoom lens as defined in claim 1, in which Conditional Formula (7) below is satisfied:

$$0.1 < D56w/D56t < 0.3 \tag{7}$$

wherein D56w is a distance along the optical axis from an apex of a surface most toward the image side within the fifth lens group to an apex of a surface most toward the object side within the sixth lens group at the wide angle end, and D56t is the distance along the optical axis from the apex of the surface most toward the image side within the fifth lens group to the apex of the surface most toward the object side within the sixth lens group at the telephoto end.

12. The zoom lens as defied in claim 7, in which Conditional Formula (3-1) below is satisfied:

$$0.8 < f3A/f3 < 1.7 \tag{3-1}$$

13. The zoom lens as defined in claim 8, in which Conditional Formula (4-1) below is satisfied:

$$-1.1 < f3/fC3A < 0 \tag{4-1}$$

14. The zoom lens as defined in claim 9, in which Conditional Formula (5-1) below is satisfied:

$$0.22 < f3/f1 < 0.3 \tag{5-1}$$

15. The zoom lens as defined in claim 10, in which Conditional Formula (6-1) below is satisfied:

$$0.35 < X3/X1 < 0.7 \tag{6-1}$$

16. The zoom lens as defined in claim 11, in which Conditional Formula (7-1) below is satisfied:

$$0.15 < D56w/D56t < 0.25 \tag{7-1}$$

17. A zoom lens comprising only the following six lens groups with refractive power in order from an object side to an image side:
a first lens group having a positive refractive power;
a second lens group having a negative refractive power;
a third lens group having a positive refractive power;
a fourth lens group having a positive refractive power;
a fifth lens group having a negative refractive power; and
a sixth lens group having a positive refractive power;
the first lens group moving toward the object side, a distance between the first lens group and the second lens group increasing, a distance between the second lens group and the third lens group decreasing, a distance between the third lens group and the fourth lens group changing, a distance between the fourth lens group and the fifth lens group changing, and a distance between the fifth lens group and the sixth lens group changing, when changing magnification from a wide angle end to a telephoto end;
the first lens group comprising only the following three lenses with refractive power, in order from the object side to the image side: a negative 1A lens, a positive 1B lens, and a positive 1C lens;
Conditional Formula (1-2) below is satisfied:

$$39 < vd1A < 45 \tag{1-2}$$

wherein vd1A is an Abbe's number with respect to a d line of the 1A negative lens; and
Conditional Formula (2) below is satisfied:

$$50 < vd3ave < 70 \tag{2}$$

wherein vd3ave is an average Abbe's number with respect to a d line of the positive lenses within the third lens group.

18. An imaging apparatus equipped with the zoom lens as defined in claim 17.

* * * * *